United States Patent
Itoo et al.

(10) Patent No.: US 11,624,427 B2
(45) Date of Patent: Apr. 11, 2023

(54) CONTINUOUSLY VARIABLE TRANSMISSION

(71) Applicant: KAWASAKI MOTORS, LTD., Akashi (JP)

(72) Inventors: Seiji Itoo, Akashi (JP); Yasuhiro Kuji, Kako-gun (JP); Shouji Ozawa, Kakogawa (JP); Kaoru Oda, Akashi (JP); Ryosuke Fujino, Kobe (JP); Hisashi Takeuchi, Akashi (JP); Manabu Hidaka, Nishinomiya (JP)

(73) Assignee: KAWASAKI MOTORS, LTD., Akashi (JP)

( * ) Notice: Subject to any disclaimer, the term of this patent is extended or adjusted under 35 U.S.C. 154(b) by 503 days.

(21) Appl. No.: 16/725,298

(22) Filed: Dec. 23, 2019

(65) Prior Publication Data

US 2021/0190182 A1 Jun. 24, 2021

(51) Int. Cl.
*F16H 9/12* (2006.01)
*F16H 9/14* (2006.01)

(52) U.S. Cl.
CPC ............... *F16H 9/125* (2013.01); *F16H 9/14* (2013.01)

(58) Field of Classification Search
CPC ......... F16H 55/563; F16H 63/067; F16H 9/18
USPC .......................................................... 474/14
See application file for complete search history.

(56) References Cited

U.S. PATENT DOCUMENTS

| | | | | |
|---|---|---|---|---|
| 590,647 A | * | 9/1897 | Jobson ............... | F16B 39/02 411/929 |
| 3,777,584 A | * | 12/1973 | Domaas ............ | F16H 61/66245 474/14 |
| 3,958,461 A | * | 5/1976 | Aaen ................. | F16H 55/563 474/14 |
| 3,962,928 A | * | 6/1976 | Beaudoin .......... | F16H 55/563 474/93 |
| 3,986,406 A | * | 10/1976 | Prasad .............. | F16H 61/66245 474/14 |
| 4,027,544 A | * | 6/1977 | Kobayashi ......... | F16H 55/563 474/14 |
| 4,051,739 A | * | 10/1977 | Takagi .............. | F16H 55/563 474/14 |
| 4,464,144 A | * | 8/1984 | Kobayashi ......... | F16H 55/563 474/43 |
| 4,575,363 A | * | 3/1986 | Burgess ............. | F16H 55/563 474/14 |
| 5,326,330 A | * | 7/1994 | Bostelmann ....... | F16H 55/563 474/14 |
| 5,391,033 A | * | 2/1995 | Gibbons ............ | F16B 39/18 411/383 |

(Continued)

FOREIGN PATENT DOCUMENTS

JP 3053807 B1 6/2000

*Primary Examiner* — Henry Y Liu
(74) *Attorney, Agent, or Firm* — Alleman Hall Creasman & Tuttle LLP

(57) ABSTRACT

A spider is screwed to a drive shaft, includes a first screw that advances in one direction of an axial direction of the drive shaft when the spider rotates relative to the drive shaft in one direction of a circumferential direction, and is fastened to the drive shaft by the first screw. A nut is screwed to the drive shaft, includes a second screw that advances in the other direction of the axial direction of the drive shaft when the nut rotates relative to the drive shaft in one direction of the circumferential direction, and is fastened to the drive shaft by the second screw.

3 Claims, 13 Drawing Sheets

(56) References Cited

U.S. PATENT DOCUMENTS

| | | | | |
|---|---|---|---|---|
| 5,562,555 A * | 10/1996 | Peterson | F16H 55/563 | 192/105 CD |
| 5,597,060 A * | 1/1997 | Huddleston | F16H 55/563 | 474/14 |
| 5,647,810 A * | 7/1997 | Huddleston | F16H 55/563 | 384/126 |
| 5,692,983 A * | 12/1997 | Bostelmann | F16H 55/563 | 474/14 |
| 5,984,602 A * | 11/1999 | Park | F16B 39/284 | 411/545 |
| 6,149,540 A * | 11/2000 | Johnson | F16H 61/66227 | 474/46 |
| 6,309,317 B1 * | 10/2001 | Joss | F16D 43/06 | 474/14 |
| 6,334,826 B1 * | 1/2002 | Takagi | F16H 55/563 | 474/14 |
| 9,057,432 B1 * | 6/2015 | Bouffard | F16H 55/56 | |
| 9,228,644 B2 * | 1/2016 | Tsukamoto | F16H 63/067 | |
| 9,500,264 B2 * | 11/2016 | Aitcin | F16H 9/14 | |
| 10,066,729 B2 * | 9/2018 | Aitcin | F16H 55/36 | |
| 11,306,809 B2 * | 4/2022 | Aitcin | B62M 27/02 | |
| 2002/0032088 A1 * | 3/2002 | Korenjak | F02B 61/045 | 474/14 |
| 2002/0042313 A1 * | 4/2002 | Aitcin | F16H 9/125 | 474/14 |
| 2002/0123400 A1 * | 9/2002 | Younggren | F16H 61/66272 | 474/14 |
| 2004/0214668 A1 * | 10/2004 | Takano | F16H 63/067 | 474/14 |
| 2005/0079937 A1 * | 4/2005 | Heide | F16H 55/56 | 474/14 |
| 2009/0227404 A1 * | 9/2009 | Beyer | F16H 55/563 | 474/14 |
| 2011/0092325 A1 * | 4/2011 | Vuksa | F16H 9/18 | 192/45.02 |
| 2012/0070246 A1 * | 3/2012 | Peng | F16B 39/36 | 411/246 |
| 2013/0157794 A1 * | 6/2013 | Stegelmann | F16H 63/067 | 474/8 |
| 2014/0004984 A1 * | 1/2014 | Aitcin | F16H 63/067 | 474/14 |
| 2014/0235382 A1 * | 8/2014 | Tsukamoto | F16H 63/067 | 474/14 |
| 2014/0349792 A1 * | 11/2014 | Aitcin | F16H 55/563 | 474/13 |
| 2015/0267792 A1 * | 9/2015 | Hochmayr | F16H 61/6624 | 474/14 |
| 2016/0069434 A1 * | 3/2016 | Aitcin | B62M 9/08 | 180/54.1 |
| 2016/0160989 A1 * | 6/2016 | Millard | F16H 55/563 | 474/14 |
| 2017/0340370 A1 * | 11/2017 | Chen | A61B 17/864 | |
| 2019/0271351 A1 * | 9/2019 | Yoon | F16B 39/30 | |

* cited by examiner

CONTINUOUSLY VARIABLE TRANSMISSION

BACKGROUND OF THE INVENTION

Field of the Invention

The present invention relates to a continuously variable transmission.

Description of Related Art

In a utility vehicle as a four-wheeled vehicle capable of traveling on a rough terrain and a saddle-type vehicle, a continuously variable transmission (CVT) that changes rotational power generated by an engine is provided.

FIG. 12 illustrates a general example of a vehicle power transmission mechanism using a CVT. The CVT includes a drive shaft 103 that is connected to a crankshaft 102 of an engine 101 and a driven shaft 104 that is connected to a transmission input shaft of a gear type transmission device G. A drive pulley 105 and a drive-pulley thrust generating mechanism 106 are provided on the drive shaft 103, and a driven pulley 107 is provided on the driven shaft 104.

The drive pulley 105 includes a fixed sheave 108 that is fixed to the drive shaft 103 in an axial direction and a rotation direction, and a movable sheave 109 that is fitted to the drive shaft 103 so as to be movable in the axial direction. The drive-pulley thrust generating mechanism 106 includes a centrifugal weight 110 rotatably supported on a rear surface of the movable sheave 109, a pressure adjusting spring 111 that biases the movable sheave 109 in a direction away from the fixed sheave 108 in the axial direction, and a spider 113 that engages with a guide projection 112 formed at the rear surface of the movable sheave 109, transmits rotation force of the drive shaft 103 to the movable sheave 109 through the guide projection 112, and guides the movement of the movable sheave 109 in the axial direction.

The spider 113 is fastened to the drive shaft 103 through screwing in many cases. In this case, although there is no problem with the engine that has been used so far, when a high torque engine is used, force acting on the spider 113 in a circumferential direction changes due to fluctuation in the torque generated whenever the drive shaft 103 rotates, and thus, there may be a problem that the fastening of the spider 113 to the drive shaft 103 through screwing is loosened. When the fastening of the spider 113 to the drive shaft 103 through screwing is loosened, a position of the spider 113 in the axial direction changes on the drive shaft 103, and thus, a speed change function by means of the CVT may be influenced.

SUMMARY OF THE INVENTION

An object of the present invention is to provide a continuously variable transmission capable of performing an appropriate speed change by reliably fastening a spider to a drive shaft.

A continuously variable transmission according to an aspect of the present invention includes a drive shaft that is driven to be rotated by driving a drive source, a drive pulley that includes a fixed sheave which is attached to the drive shaft and is fixed to the drive shaft in an axial direction and a circumferential direction and a movable sheave which is fixed to the drive shaft in the circumferential direction and is relatively movable in the axial direction, a driven shaft that is driven according to rotation of the drive shaft, a driven pulley that is attached to the driven shaft, a belt that is wound between the drive pulley and the driven pulley, and a drive-pulley thrust generating mechanism that moves the movable sheave relative to the drive shaft on the drive shaft. The drive-pulley thrust generating mechanism includes a centrifugal weight that is rotatable relative to the movable sheave according to a centrifugal force caused by the rotation of the drive shaft, a spider that includes an abutting portion on which the centrifugal weight abuts, is fixed to the drive shaft in the axial direction and the circumferential direction through screwing, and moves the movable sheave relative to the drive shaft in the axial direction according to rotation of the centrifugal weight, and a nut that is disposed adjacent to the spider in the axial direction at a position on a side on which the screwing of the spider is loosened, and is fixed to the drive shaft in the axial direction and the circumferential direction through screwing. The spider is screwed to the drive shaft, includes a first screw that advances in one direction of the axial direction of the drive shaft when the spider rotates relative to the drive shaft in one direction of the circumferential direction, and is fastened to the drive shaft by the first screw. The nut is screwed to the drive shaft, includes a second screw that advances in the other direction of the axial direction of the drive shaft when the nut rotates relative to the drive shaft in the one direction of the circumferential direction, and is fastened to the drive shaft by the second screw.

According to the aforementioned configuration, since the spider is fastened to the drive shaft by the first screw that advances in one direction of the axial direction when the spider rotates relative to the drive shaft in one direction of the circumferential direction and the nut is fastened to the drive shaft by the second screw that advances in the other direction of the axial direction when the nut rotates relative to the drive shaft in one direction of the circumferential direction, the orientation of the force acting on the spider in the circumferential direction changes, and thus, the nut can prevent the spider from moving in the axial direction toward the direction in which the spider is loosened even though the force in the direction in which the spider is loosened with respect to the drive shaft acts in the circumferential direction and the spider moves in the second direction of the axial direction. When the spider and the nut abut on each other, even though the spider rotates in the circumferential direction in the direction in which the spider is loosened, the nut moves in the direction in which the nut abuts on the spider in the axial direction due to the rotation thereof. Accordingly, the spider and the nut push against each other on the drive shaft, and thus, it is possible to inhibit the spider from moving in the axial direction in the direction in which the spider is further loosened. Therefore, it is possible to inhibit the fastening of the spider and the drive shaft from being further loosened. Since the spider is disposed at an appropriate position without being loosened, it is possible to provide the continuously variable transmission capable of performing an appropriate speed change.

A continuously variable transmission according to another aspect of the present invention includes a drive shaft that is driven to be rotated by driving a drive source, a drive pulley that includes a fixed sheave which is attached to the drive shaft and is fixed to the drive shaft in an axial direction and a circumferential direction and a movable sheave which is fixed to the drive shaft in the circumferential direction and is relatively movable in the axial direction, a driven shaft that is driven according to rotation of the drive shaft, a driven pulley that is attached to the driven shaft, a belt that is wound between the drive pulley and the driven pulley, and a drive-pulley thrust generating mechanism that moves the movable sheave relative to the drive shaft on the drive shaft. The drive-pulley thrust generating mechanism includes a centrifugal weight that is supported to be rotatable relative to the movable sheave according to a centrifugal force caused by the rotation of the drive shaft, a spider that includes an abutting portion on which the centrifugal weight abuts, is fixed to the drive shaft in the axial direction and the circumferential direction through screwing, and moves the movable sheave relative to the drive shaft in the axial direction according to rotation of the centrifugal weight, and a retaining member which is disposed at a position on a side on which the screwing of the spider is loosened in the axial direction and of which rotation is not converted into movement in the axial direction even though the retaining member rotates around a rotational axis of the drive shaft. The retaining member prevents the spider from moving by abutting on the spider when the spider moves to the side on which the screwing is loosened in the axial direction.

According to the above configuration, when the retaining member is disposed at the position on the side on which the screwing of the spider is loosened in the axial direction and the spider moves to the side on which the screwing is loosened, the retaining member prevents the spider from moving by abutting on the spider, and thus, even though the spider rotates around the rotation axis in a state in which the retaining member and the spider abut on each other, the retaining member does not move in the axial direction, and the retaining member can prevent the spider from moving in the axial direction. Therefore, it is possible to prevent the spider from further moving in the axial direction.

A continuously variable transmission according to still another aspect of the present invention includes a drive shaft that is driven to be rotated by driving a drive source, a drive pulley that includes a fixed sheave which is attached to the drive shaft and is fixed to the drive shaft in an axial direction and a circumferential direction and a movable sheave which is fixed to the drive shaft in the circumferential direction and is relatively movable in the axial direction, a driven shaft that is driven according to rotation of the drive shaft, a driven pulley that is attached to the driven shaft, a belt that is wound between the drive pulley and the driven pulley, and a drive-pulley thrust generating mechanism that moves the movable sheave relative to the drive shaft on the drive shaft. The drive-pulley thrust generating mechanism includes a centrifugal weight that is supported to be rotatable relative to the movable sheave according to a centrifugal force caused by the rotation of the drive shaft, a sleeve that is fixed to the drive shaft through screwing, and a spider that includes an abutting portion on which the centrifugal weight abuts, is fixed to the sleeve in the axial direction and the circumferential direction through screwing, and moves the movable sheave relative to the drive shaft in the axial direction according to rotation of the centrifugal weight. The sleeve is disposed at an inner peripheral position of the spider, and includes a stopper which protrudes outward in a radial direction at a position on a load direction side to which a load is applied by the centrifugal weight from a position at which the sleeve is fixed to the spider through screwing in the axial direction and prevents the spider from moving in the load direction by abutting on the spider. The drive shaft is made of iron, and the sleeve is made of iron.

According to the aforementioned configuration, as for the movement of the spider in the axial direction, since the sleeve includes the stopper protruding in the radial direction, the stopper can prevent the spider from moving to the load direction side. Since the drive shaft is made of iron and the sleeve is made of iron, it is possible to prevent the sleeve from being easily loosened due to a difference in thermal expansion at a portion at which the sleeve and the drive shaft are fastened by a screw. Accordingly, it is possible to prevent the sleeve from moving when the continuously variable transmission is heated to a high temperature, and it is possible to provide the continuously variable transmission having excellent heat resistance. As for the movement of the sleeve in the axial direction, since the length of the portion in the axial direction at which the sleeve is fastened by being screwed to the drive shaft at the inner peripheral position of the spider can be set to be long, it is possible to firmly fasten the sleeve and the drive shaft. Therefore, it is possible to prevent the sleeve from moving to the drive shaft in the axial direction.

A continuously variable transmission according to still another aspect of the present invention includes a drive shaft that is driven to be rotated by driving a drive source, a sleeve that is attached to an outer side of the drive shaft in a radial direction, a drive pulley that includes a fixed sheave which is attached to the sleeve and is fixed to the drive shaft in an axial direction and a circumferential direction and a movable sheave which is fixed to the sleeve in the circumferential direction and is relatively movable in the axial direction, a driven shaft that is driven according to rotation of the drive shaft, a driven pulley that is attached to the driven shaft, a belt that is wound between the drive pulley and the driven pulley, and a drive-pulley thrust generating mechanism that moves the movable sheave relative to the drive shaft on the drive shaft. The drive-pulley thrust generating mechanism includes a centrifugal weight that is supported to be rotatable relative to the movable sheave according to a centrifugal force caused by the rotation of the drive shaft, and a spider that includes an abutting portion on which the centrifugal weight abuts, is fixed to the sleeve in the axial direction and the circumferential direction through screwing, and moves the movable sheave relative to the drive shaft in the axial direction according to rotation of the centrifugal weight. The sleeve includes a stopper which protrudes outward in the radial direction at a position on a load direction side to which a load is applied by the centrifugal weight from a position at which the sleeve is fixed to the spider through screwing in the axial direction and prevents the spider from moving in the load direction side by abutting on the spider.

According to the aforementioned configuration, since the sleeve attached to the outer side of the rotating shaft in the radial direction includes the stopper that protrudes outward in the radial direction at the position on the load direction side from the position at which the sleeve is fixed to the spider through screwing and prevents the spider from moving to the load direction side, even though the spider moves to the load direction side, the spider is prevented from moving by abutting on the stopper. Accordingly, it is possible to prevent the spider from further moving to the load direction side. In the continuously variable transmission, since the portion at which the sleeve abuts on the drive shaft is long, it is possible to firmly fasten the sleeve and the drive shaft.

A continuously variable transmission according to still another aspect of the present invention includes a drive shaft that is driven to be rotated by driving a drive source, a drive pulley that includes a fixed sheave which is attached to the drive shaft and is fixed to the drive shaft in an axial direction and a circumferential direction and a movable sheave which is fixed to the drive shaft in the circumferential direction and is relatively movable in the axial direction, a driven shaft that is driven according to rotation of the drive shaft, a driven pulley that is attached to the driven shaft, a belt that is wound between the drive pulley and the driven pulley, and a drive-pulley thrust generating mechanism that moves the movable sheave relative to the drive shaft on the drive shaft. The drive-pulley thrust generating mechanism includes a centrifugal weight that is supported to be rotatable relative to the movable sheave according to a centrifugal force caused by the rotation of the drive shaft, a spider that is fixed to the sleeve in an axial direction and a circumferential direction through screwing and moves the movable sheave relative to the drive shaft in the axial direction according to rotation of the centrifugal weight, a first sleeve that is disposed at a position on a load direction side to which a load is applied by the centrifugal weight from a position at which the spider and the drive shaft are fixed through screwing in the axial direction and is attached to the drive shaft at a position on an outer side of the drive shaft in a radial direction, a second sleeve that is fixed to the drive shaft at a position opposite to the load direction side from the spider and an inner peripheral position of the spider in the axial direction and at a position on an outer side of the drive shaft in the radial direction, and is fixed to the spider in the axial direction and the circumferential direction, and a nut that is disposed at a position on the load direction side from the first sleeve in the axial direction, prevents the first sleeve from moving to the load direction side by abutting on the first sleeve, and is attached by being screwed to the drive shaft. The first sleeve includes a stopper that prevents the spider from moving to the load direction side by abutting on the spider at an end of the spider side in the axial direction while abutting on an end on the load direction side of the second sleeve in the axial direction.

According to the aforementioned configuration, since the first sleeve includes the stopper that abuts on the spider and prevents the spider from moving to the load direction side, the stopper and the spider abut on each other, and thus, the stopper can prevent the spider from moving to the load direction side. Since the stopper abuts on the end of the second sleeve in the axial direction and the first sleeve is supported by the nut in the axial direction, the first sleeve and the second sleeve are pushed against each other, and the first sleeve and the second sleeve surround the spider. Accordingly, it is possible to reliably prevent the spider from moving.

The aforementioned object, other objects, features and advantages of the present invention will be apparent from the following detailed description of preferred embodiments with reference to the attached drawings.

DETAILED DESCRIPTION OF PREFERRED EMBODIMENTS

Hereinafter, embodiments will be described with reference to the drawings.

First Embodiment

Figure 1:
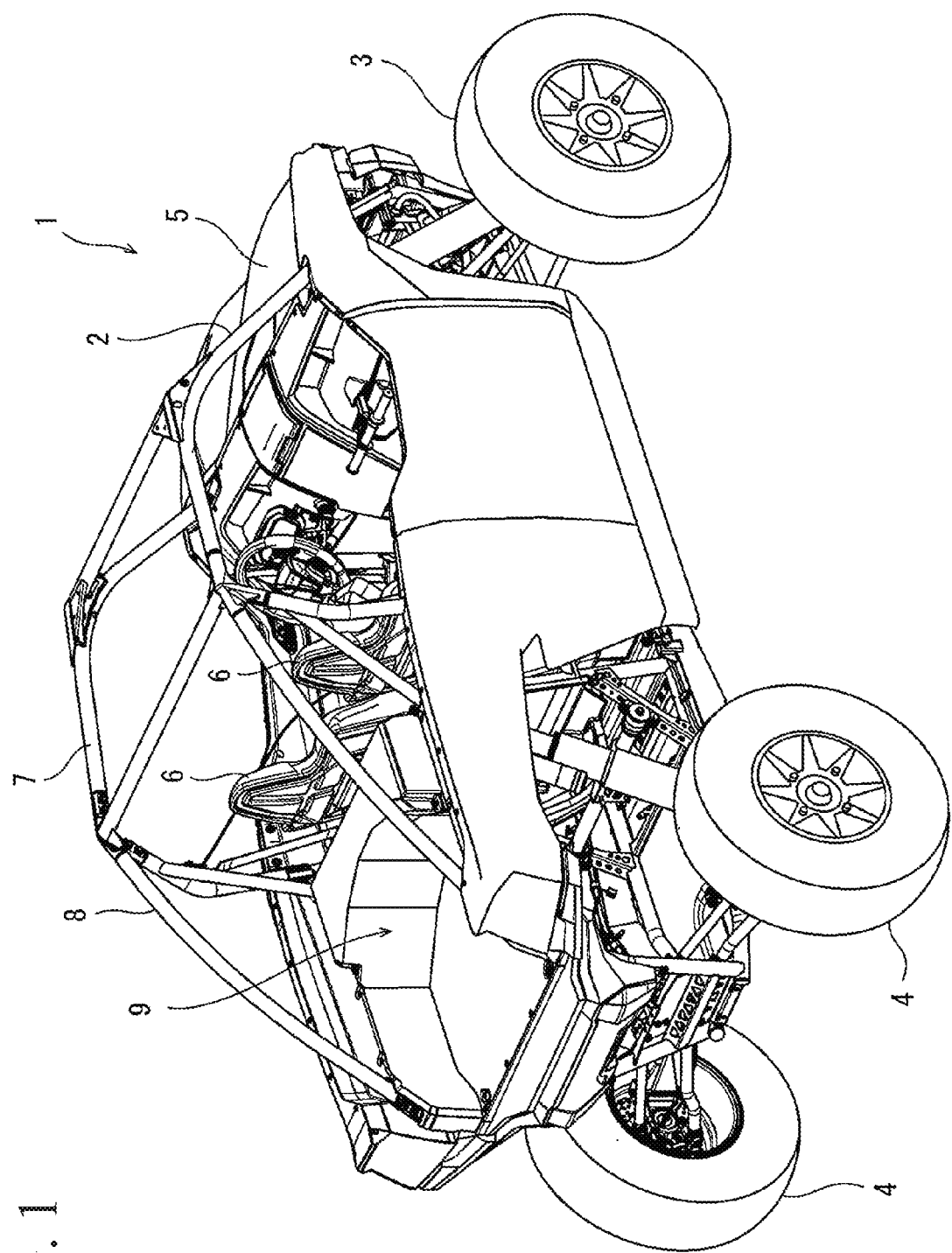
FIG. 1 is a perspective view of a utility vehicle according to a first embodiment.

FIG. 1 is a perspective view of a utility vehicle 1 according to a first embodiment. As illustrated in FIG. 1, the utility vehicle 1 includes a pair of left and right front wheels 3 supported by a front part of a body frame 2 and a pair of left and right rear wheels 4 supported by a rear part of the body frame 2. A space between the left and right front wheels 3 is covered by a resin hood 5 from above. A pair of passenger seats 6 (driver's seat and front passenger seat) are arranged side by side near a center of the body frame 2 in a front-rear direction on a rear side of the hood 5.

The body frame 2 includes a cabin frame 7, and a pair of left and right rear gusset frames 8. The body frame 2 is a pipe frame formed by connecting a plurality of pipe members to each other. The cabin frame 7 is formed so as to surround a passenger compartment in which the passenger seats 6 are provided.

A cargo carrier 9 that forms a concave loading space is provided behind the passenger seats 6. Below the cargo carrier 9, an engine (not illustrated) and a continuously variable transmission are loaded. The engine generates rotational power for driving driving wheels. When the utility vehicle 1 is a vehicle with two-wheel drive, the front wheels 3 or the rear wheels 4 are the driving wheels, and when the utility vehicle 1 is a vehicle with four-wheel drive, the front wheels 3 and the rear wheels 4 are the driving wheels.

Figure 2:
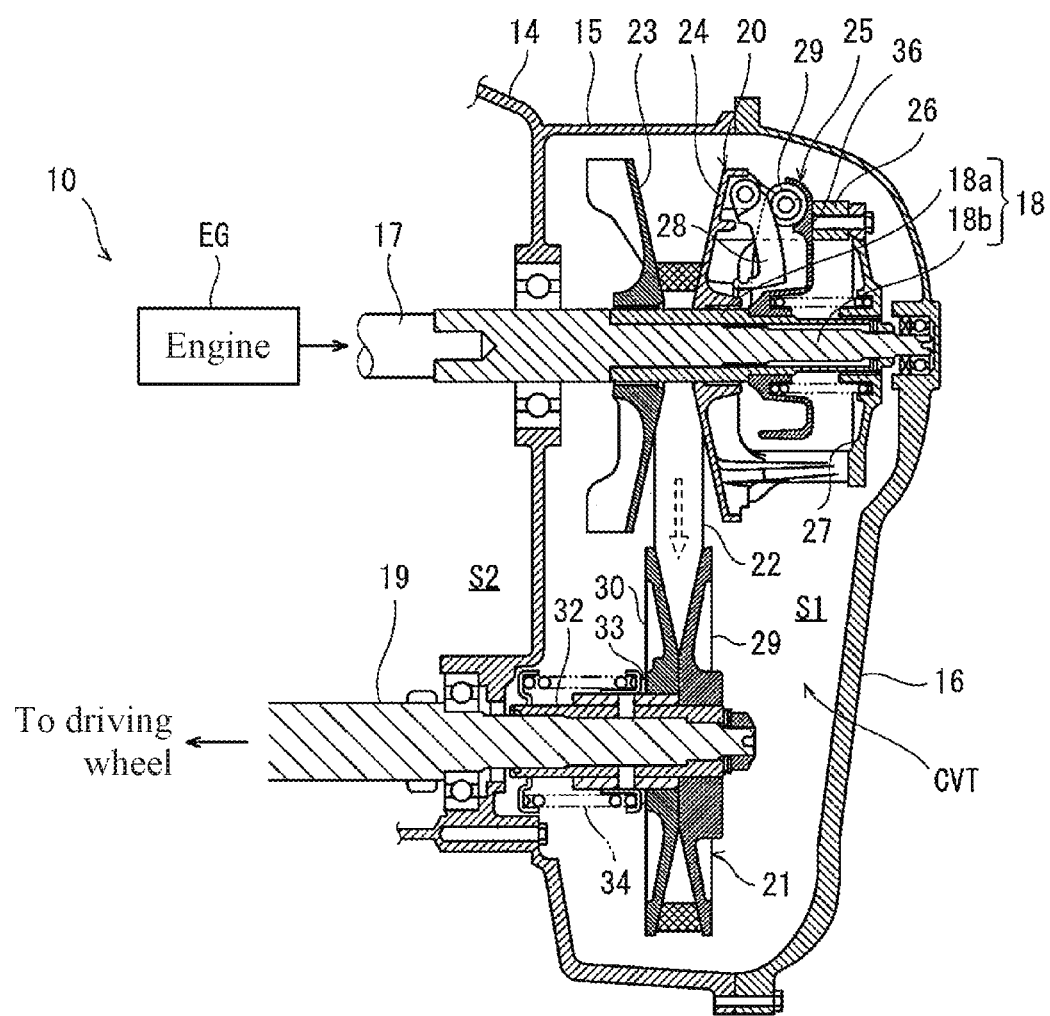
FIG. 2 is a horizontal cross-sectional view of a power transmission structure of the utility vehicle illustrated in FIG. 1.

FIG. 2 is a horizontal sectional view of a power transmission structure 10 of the utility vehicle 1 illustrated in FIG. 1. As illustrated in FIG. 2, the power transmission structure 10 transmits the rotational power of an engine EG to the driving wheels (front wheels 3 and/or rear wheels 4). In the power transmission structure 10, the rotational power of a crankshaft 17 of the engine EG is transmitted to a continuously variable transmission CVT, is also changed by the continuously variable transmission CVT, and is transmitted to the driving wheels.

A CVT housing 15 is provided on an outer wall of a crankcase 14 of the engine EG. That is, the CVT housing 15 is provided adjacent to the engine EG. The CVT housing 15 is covered with a CVT cover 16 to form a CVT housing space S1 which is long in the front-rear direction. A crankshaft 17 extending in a vehicle width direction is disposed inside the crankcase 14 and protrudes toward the CVT housing space S1. A continuously variable transmission CVT is disposed in the CVT housing space S1.

The continuously variable transmission CVT is, for example, a V-belt type continuously variable transmission, and is housed in the CVT housing space S1. The continuously variable transmission CVT includes a drive shaft 18 that is connected to the crankshaft 17 to receive the rotational power from the engine EG, and a driven shaft 19 that outputs the rotational power to a drive shaft 12 side (driving wheel side). The drive shaft 18 is supported by a side wall of the crankcase 14 and the CVT cover 16 in a both-sided holding state.

A drive pulley 20 is provided at the drive shaft 18, and a driven pulley 21 is provided at the driven shaft 19. In the present embodiment, the drive shaft 18 includes a main body 18a and a shaft sleeve 18b provided on an outer side of the main body 18a in a radial direction. A V-shaped belt 22 is wound around the drive pulley 20 and the driven pulley 21. The drive pulley 20 includes a fixed sheave 23 that is fixed to the shaft sleeve 18b of the drive shaft 18, and a movable sheave 24 that is fitted to the shaft sleeve 18b of the drive shaft 18 so as to be movable in an axial direction. The continuously variable transmission CVT has a drive-pulley thrust generating mechanism 25 for moving the movable sheave 24. The belt 22 is pinched between conical pinching surfaces formed on the sheaves 23 and 24, and when the movable sheave 24 moves on the drive shaft 18 and a distance from the fixed sheave 23 changes, a position (that is, an effective diameter of the drive pulley 20) in the radial direction in which the belt 22 is pinched changes.

A supporting plate 27 is coupled to a rear surface of the movable sheave 24 through a plurality of connecting arms 26 extending outward, and thus, the supporting plate 27 can be configured to be movable in the axial direction of the drive shaft 18 integrally with the movable sheave 24. The drive-pulley thrust generating mechanism 25 is provided between the movable sheave 24 and the supporting plate 27.

In the present embodiment, the drive-pulley thrust generating mechanism 25 includes a plurality of centrifugal weights 28 and a spider 36 fixed on the shaft sleeve 18b of the drive shaft 18 in the axial direction. The spider 36 includes a pressure receiving roller 29. When the centrifugal weights 28 move in the axial direction, the spider 36 is configured to abut against the centrifugal weights 28 and push the centrifugal weights 28 back in a reverse direction. When the drive shaft 18 rotates and the plurality of centrifugal weights 28 rotate in a direction away from the movable sheave 24 due to centrifugal force, the movable sheave 24 is moved close to the fixed sheave 23 by reaction force that pushes the pressure receiving roller 29. That is, the drive-pulley thrust generating mechanism 25 generates thrust that narrows the distance between the fixed sheave 23 and the movable sheave 24 by a rotational centrifugal force of the drive pulley 20.

Figure 3A:
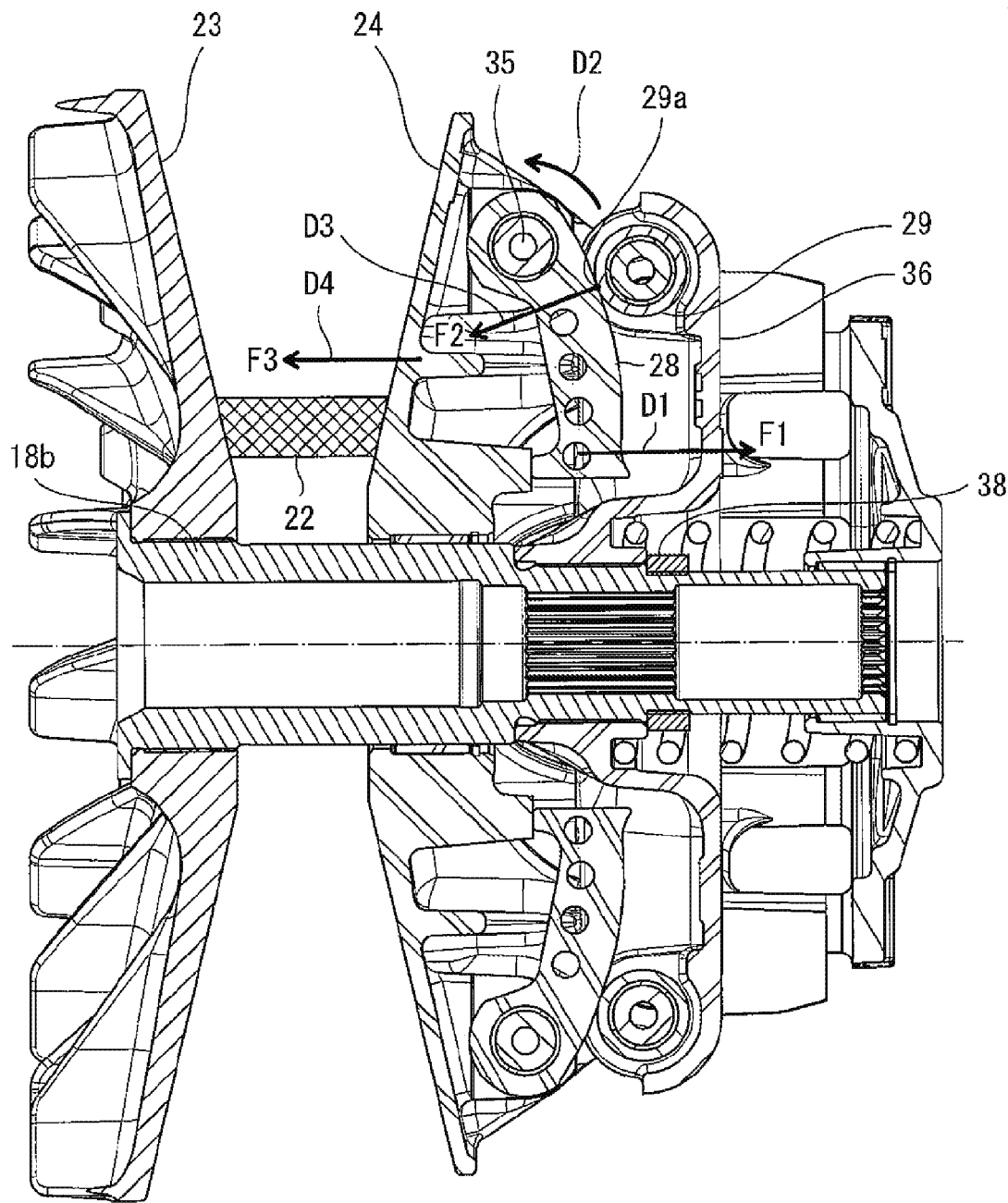
FIG. 3A is a cross-sectional view illustrating of a continuously variable transmission of the power transmission structure of FIG. 2 in a state in which a centrifugal weight does not rotate.
Figure 3B:
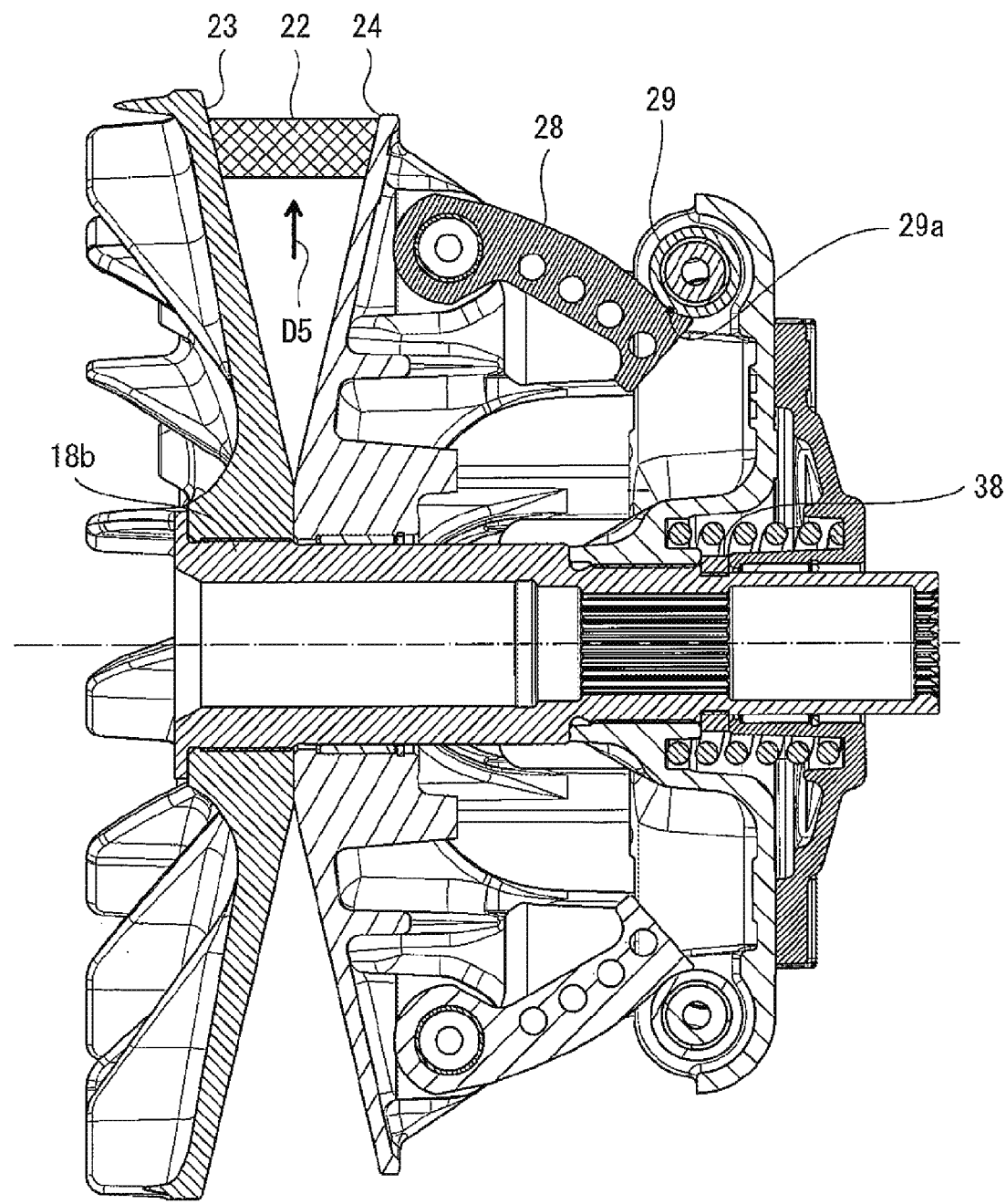
FIG. 3B illustrates a cross-sectional view in a state in which the centrifugal weight rotates.

FIG. 3A illustrates a cross-sectional view of the drive-pulley thrust generating mechanism 25 in a state in which the centrifugal weights 28 do not rotate, and FIG. 3B illustrates a cross-sectional view of the drive-pulley thrust generating mechanism 25 in a state in which the centrifugal weights 28 rotate. In FIGS. 3A and 3B, only the shaft sleeve 18b of the drive shaft 18 is illustrated, and the main body 18a is omitted. The centrifugal weights 28 are configured to be able to rotate around a rotation shaft 35. When the rotation of the drive shaft 18 enters a high rotational speed state, centrifugal force F1 acts on the centrifugal weights 28 in a direction from the fixed sheave 23 to the movable sheave 24 illustrated in FIG. 3A (a direction of an arrow DD. At this time, force acts such that the centrifugal weights 28 rotate around the rotation shaft 35 in a direction of an arrow D2 by the centrifugal force F1. Since the spider 36 is configured not to move relative to the drive shaft 18 in the axial direction, when the centrifugal weights 28 rotate in the D2 direction, the centrifugal weights 28 and the pressure receiving roller 29 abut on each other, and force F2 that pushes back the centrifugal weights 28 at abutting portions 29a of the pressure receiving roller 29 which abut on the centrifugal weights 28 acts in a direction from the pressure receiving roller 29 toward the centrifugal weights 28 (in a direction of an arrow D3).

Since the force F2 in the direction from the pressure receiving roller 29 toward the centrifugal weights 28 act on the centrifugal weights 28, axial force F3 toward the fixed sheave 23 acts on the movable sheave 24. Since the force F3 acts on the movable sheave 24, the movable sheave 24 moves in the direction toward the fixed sheave 23 in the axial direction (a direction of an arrow D4), and the movable sheave 24 consequently moves to a position illustrated in FIG. 3B. As stated above, the spider 36 moves the movable sheave 24 relative to the drive shaft 18 in the axial direction according to the rotation of the centrifugal weights 28 by pushing back the centrifugal weights 28.

The driven pulley 21 (FIG. 2) includes a fixed sheave 29 fixed to the driven shaft 19 and a movable sheave 30 fitted to the driven shaft 19 so as to be movable in the axial direction. For example, a cam cylinder 32 having a plurality of spiral cam grooves is fixed to an outer peripheral surface of the driven shaft 19, and the cam cylinder 32 and the fixed sheave 29 rotate together with the driven shaft 19. A sleeve 33 is integrally coupled to an inner peripheral end of the movable sheave 30. The sleeve 33 is fitted to an outer peripheral surface of the cam cylinder 32 so as to be movable in the axial direction, and supports a roller (not illustrated) movable along the cam grooves of the cam cylinder 32.

When the movable sheave 30 receives rotational force due to a tension of the belt 22, thrust toward the fixed sheave 29 is generated in the movable sheave 30 by a cam action of the cam cylinder 32 and the roller. The sleeve 33 is biased toward the fixed sheave 29 by a pressure adjusting spring 34, and the movable sheave 30 is pushed toward the fixed sheave 29.

With this configuration, when the drive shaft 18 has a low rotational speed, the effective diameter of the drive pulley 20 is small and an effective diameter of the driven pulley 21 is large (that is, a reduction gear ratio is large). When an engine speed increases, the movable sheave 24 moves close to the fixed sheave 23 due to the generation of the thrust of the drive-pulley thrust generating mechanism 25 caused by an increase in centrifugal force of the drive pulley 20. When the movable sheave 24 moves from a position illustrated in FIG. 3A to a position illustrated in FIG. 3B, the belt 22 moves outward in the radial direction of the belt 22 as indicated by an arrow D5 in FIG. 3B. Accordingly, the effective diameter of the drive pulley 20 increases. In contrary, in the driven pulley 21, the tension of the belt 22 increases, and the force inwards in the radial direction of the belt 22 increases. The movable sheave 30 moves in a direction away from the fixed sheave 29 against spring force of the pressure adjusting spring 34 and cam thrust of the cam cylinder 32, and the effective diameter of the driven pulley 21 decreases. As stated above, the reduction gear ratio of the continuously variable transmission CVT continuously decreases as the engine speed increases.

In the present embodiment, the driven shaft 19 protrudes toward an internal space S2 of the crankcase 14. Therefore, the driven shaft 19 extends over both the internal space S2 of the crankcase 14 and the CVT housing space S1. The driven shaft 19 rotates together with the driven pulley 21. The driven shaft 19 is connected to the driving wheels through, for example, a manual transmission (not illustrated) or a clutch. Although it has been described in the present embodiment that the driven shaft 19 protrudes toward the internal space S2 of the crankcase 14, when the driven shaft 19 is connected to the manual transmission, the driven shaft 19 may protrude toward a case that houses the manual transmission. The driven shaft 19 may extend toward other components.

The D1 direction in which a load is applied by the centrifugal force F1 when the centrifugal force F1 is applied to the centrifugal weights 28 is referred to as a load direction. In the continuously variable transmission CVT, a position on a D1 direction side to which the load is applied by the centrifugal force F1 of the centrifugal weights 28 is referred to as a position on a load direction side.

Figure 4:
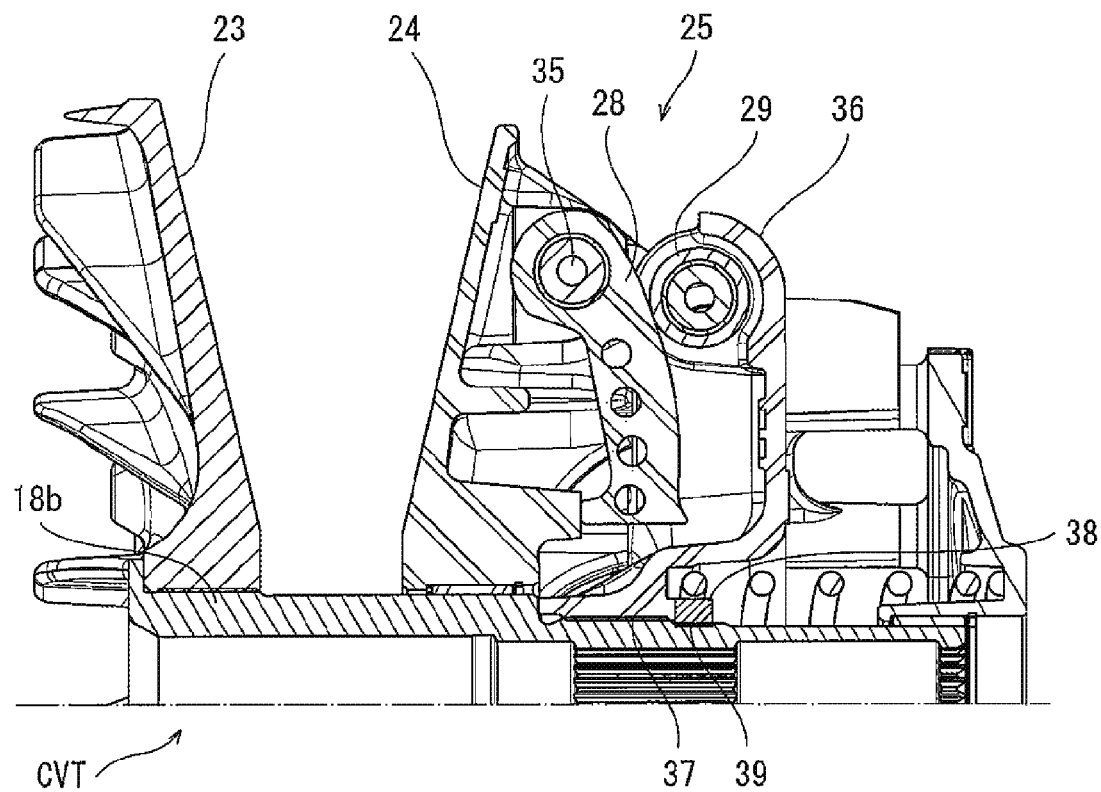
FIG. 4 is an enlarged cross-sectional view of the periphery of a portion at which a spider and a drive shaft of the continuously variable transmission of FIG. 3A are fastened.

Next, the attachment of the spider 36 to the shaft sleeve 18b in the drive shaft 18 will be described with reference to FIG. 4. FIG. 4 illustrates a cross-sectional view of the periphery of a portion at which the spider 36 is attached to the shaft sleeve 18b. The spider 36 is fixed to the drive shaft 18 in the axial direction and a circumferential direction by being screwed to an outer peripheral surface of the shaft sleeve 18b at a position retracted inwards in the radial direction of the drive shaft 18 from a surface onto which the movable sheave 24 is attached. Accordingly, the spider 36 is screwed to the shaft sleeve 18b, and includes a first screw 37 which advances toward one side in the axial direction of the shaft sleeve 18b when the spider rotates relative to the shaft sleeve 18b toward one side in the circumferential direction. The spider 36 is fastened to the shaft sleeve 18b by the first screw 37.

The drive-pulley thrust generating mechanism 25 includes a nut 38 at a position adjacent to the spider 36 in the axial direction. The nut 38 is fixed to the drive shaft 18 by being screwed in the axial direction and the circumferential direction. The nut 38 is bonded to the shaft sleeve 18b of the drive shaft 18 with an adhesive. In the present embodiment, the nut 38 is disposed adjacent to the spider 36 in the axial direction at a position at which the screwing of the spider 36 is loosened. In the present embodiment, the screwing of the spider 36 is tightened in a direction from the movable sheave 24 toward the fixed sheave 23 in the axial direction of the drive shaft 18, and is loosened in a direction from the fixed sheave 23 toward the movable sheave 24. The nut 38 is disposed at a position adjacent to the spider 36 on a side in the direction from the fixed sheave 23 to the movable sheave 24 in the axial direction of the drive shaft 18.

The nut 38 is screwed to the shaft sleeve 18b, and includes a second screw 39 which advances toward the other side in the axial direction of the drive shaft 18 when the nut rotates relative to the drive shaft 18 toward one side in the circumferential direction. That is, when the nut 38 is rotated in the same direction as the direction which the spider 36 rotates in the circumferential direction of the drive shaft 18, the nut 38 includes the second screw 39 that advances in a direction opposite to the direction in which the spider 36 advances in the axial direction. The nut 38 is fastened to the drive shaft 18 by the second screw 39.

The spider 36 is fastened to the drive shaft 18 by the first screw 37 with respect to the drive shaft 18 and the nut 38 is fastened to the drive shaft 18 by the second screw 39 that advances in the direction opposite to the first screw 37 with respect to the drive shaft 18. Thus, even though an orientation of the force acting on the spider 36 in the circumferential direction changes, and the force in the direction in which the screwing of the spider 36 is loosened against the drive shaft 18 acts in the circumferential direction, thereby, the spider 36 moves in the direction in which the screwing is loosened, the spider 36 and the nut 38 abut on each other, and thus, it is possible to prevent the movement in the axial direction in the direction in which the screwing of the spider 36 is loosened by using the nut 38. When the spider 36 and the nut 38 are in contact with each other, even though the spider 36 rotates in the circumferential direction in the direction in which the screwing is loosened, the nut 38 moves in the direction in which the nut abuts on the spider 36 in the axial direction due to the rotation thereof. Therefore, the spider 36 and the nut 38 pushes against each other on the drive shaft 18, and thus, it is possible to inhibit the spider 36 from moving in the axial direction in a direction in which the screwing of the spider 36 is further loosened. Accordingly, it is possible to inhibit the fastening between the spider 36 and the drive shaft 18 from being further loosened. Since the spider 36 is disposed at an appropriate position without being loosened, it is possible to provide the continuously variable transmission capable of performing an appropriate speed change.

In the engine EG, the force acting on the crankshaft 17 (FIG. 2) in the rotational direction changes during intake, compression, explosion, expansion, and exhaust strokes. Thus, the force acting on the spider 36 from the drive shaft 18 connected to the crankshaft 17 in a direction around an axis of the drive shaft 18 changes with a change in stroke of the engine EG. The force acting on the spider 36 in the direction around the axis of the drive shaft 18 changes, and thus, the screwing of the spider 36 to the drive shaft 18 is likely to be loosened. In the present embodiment, even though the spider 36 moves in the direction in which the screwing is loosened in the axial direction, the spider 36 and the nut 38 abut on each other, and it is possible to prevent the movement in the axial direction in which the screwing of the spider 36 is loosened by the nut 38.

In the present embodiment, a shaft diameter of the portion at which the spider 36 is screwed to the drive shaft 18 by the first screw 37 is larger than a shaft diameter of the portion at which the nut 38 is screwed to the drive shaft 18 by the second screw 39. Since the shaft diameter of the portion at which the spider 36 is screwed to the drive shaft 18 by the first screw 37 is larger than the shaft diameter of the portion at which the nut 38 is screwed to the drive shaft 18 by the second screw 39, the nut 38 is screwed to the drive shaft 18 after the spider 36 is screwed to the drive shaft, and thus, both the spider 36 and the nut 38 can be easily screwed to the drive shaft 18.

In the present embodiment, the nut 38 is bonded to the shaft sleeve 18b of the drive shaft 18 with an adhesive. Therefore, when the spider 36 moves in the direction in which the screwing is tightened in the axial direction by changing the orientation of the force acting on the spider 36, even though the spider 36 moves in the direction away from the nut 38, the nut 38 is fixed by being bonded to the shaft sleeve 18b with the adhesive. Therefore, even though the force in the direction in which the screwing is loosened acts on the nut 38 due to a cause other than the spider 36, it is possible to inhibit the nut 38 from being loosened alone.

In the present embodiment, a pitch of the first screw 37 by which the spider 36 is screwed to the shaft sleeve 18b of the drive shaft 18 is larger than a pitch of the second screw 39 by which the nut 38 is screwed to the shaft sleeve 18b of the drive shaft 18. Since the pitch of the first screw 37 is larger than the pitch of the second screw 39, when the spider 36 moves in the direction of the movable sheave 24 in the axial direction by changing the orientation of the force acting on the spider 36, the spider 36 moves more than the nut 38 in the direction of the movable sheave 24, and the spider 36 is easily separated from the nut 38. Therefore, even though the spider 36 rotates around the axis of the drive shaft 18 such that the spider 36 moves in the direction of the movable sheave 24, since it is possible to prevent the nut 38 and the spider 36 from greatly moving in the direction opposite to the movable sheave 24 in the axial direction, it is possible to prevent the nut 38 from being detached from the portion fastened to the drive shaft 18 by the second screw 39.

Second Embodiment

Next, a continuously variable transmission according to a second embodiment will be described. The description of portions having the same configurations as those in the first embodiment are omitted, and only different portions are described. Although it has been described in the first embodiment that the loosening of the spider 36 is prevented by providing a nut 38 screwed to the shaft sleeve 18b of the drive shaft 18 at the position adjacent to the spider 36 in the axial direction, the second embodiment is different from the first embodiment in that the loosening of the spider 36 is prevented by providing a retaining member fixed to the drive shaft 18 in the axial direction and the circumferential direction through interference fitting at the position adjacent to the spider 36 in the axial direction.

Figure 5:
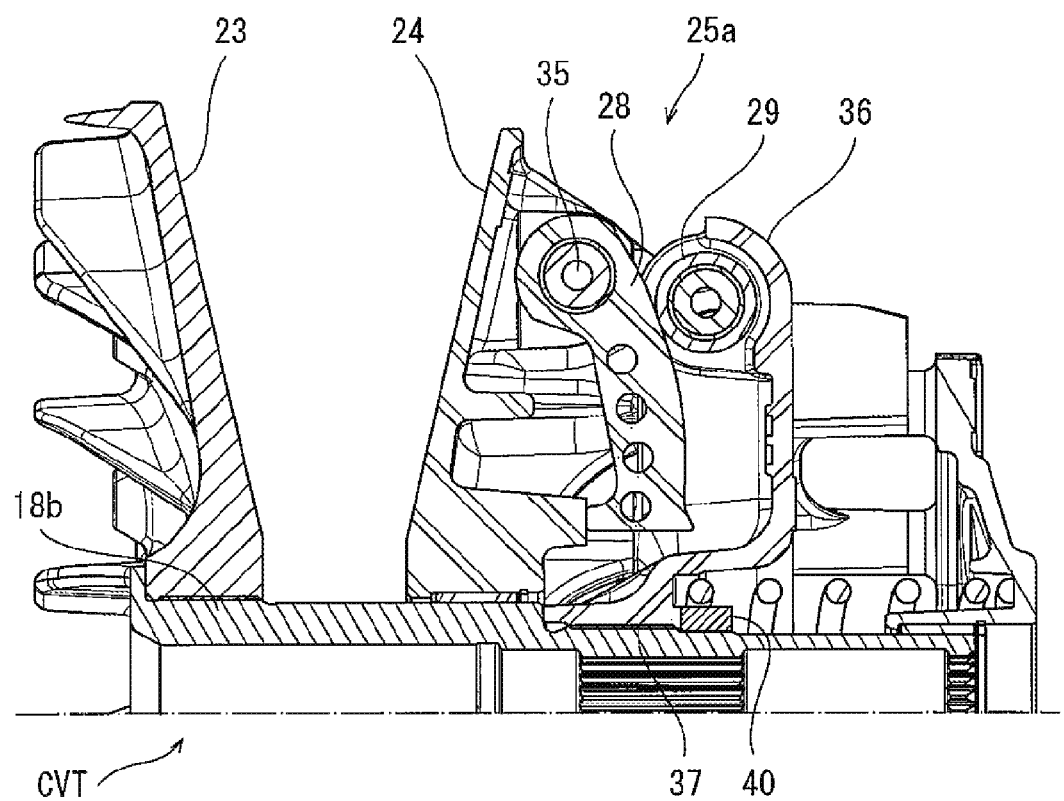
FIG. 5 is an enlarged cross-sectional view of the periphery of a portion at which a spider and a drive shaft of a continuously variable transmission according to a second embodiment are fastened.

The continuously variable transmission CVT according to the second embodiment will be described with reference to FIG. 5. FIG. 5 illustrates a cross-sectional view of a drive-pulley thrust generating mechanism 25a of the second embodiment. In FIG. 5, only the shaft sleeve 18b of the drive shaft 18 is illustrated, and the main body 18a is omitted. In the second embodiment, the spider 36 is fixed to the shaft sleeve 18b of the drive shaft 18 through screwing. Further, a retaining member 40 is provided at the position adjacent to the spider 36 in the axial direction of the drive shaft 18. In the present embodiment, the retaining member 40 is a ring-shaped member. The retaining member 40 is disposed adjacent to a position on a side on which the screwing of the spider 36 is loosened in the axial direction of the drive shaft 18. The retaining member 40 is fixed to the drive shaft 18 in the axial direction and the circumferential direction through interference fitting.

When the spider 36 rotates around the rotational axis of the drive shaft 18 and moves in the axial direction of the drive shaft 18 by applying circumferential force in the direction in which the screwing is loosened onto the spider 36, the spider 36 and the retaining member 40 abut. Even though the spider 36 further rotates in a state in which the spider 36 and the retaining member 40 abut on each other and the rotation of the spider 36 is transmitted to the retaining member 40, since the retaining member 40 is fixed to the drive shaft 18 through interference fitting, the retaining member 40 does not move in the axial direction of the drive shaft 18. Since the retaining member 40 is fixed in the axial direction of the drive shaft 18 and rotates together with the drive shaft 18, the rotation of the retaining member 40 is not converted to the movement in the axial direction unlike the nut 38 of the first embodiment. The retaining member 40 can prevent the spider 36 from further moving in the axial direction by staying in place without moving in the axial direction and abutting on the spider 36. Therefore, it is possible to inhibit the spider 36 from further moving in the axial direction.

Since the retaining member 40 is reliably fixed to the drive shaft 18 through interference fitting, even though the retaining member 40 is pushed by the spider 36 in the direction in which the screwing of the spider 36 is loosened in the axial direction, it is possible to more reliably inhibit the retaining member 40 and the spider 36 from further moving in the direction in which the screwing of the spider is loosened against the force.

Third Embodiment

Next, a continuously variable transmission according to a third embodiment will be described. The description of portions having the same configurations as those in the first embodiment and the second embodiment are omitted, and only different portions are described. Although it has been described in the second embodiment that the loosening of the spider 36 is prevented by providing the retaining member 40 fixed to the drive shaft 18 through interference fitting at the position adjacent to the spider 36 in the axial direction, the third embodiment is different from the second embodiment in that the loosening of the spider 36 is prevented by a retaining member constituted by a circlip.

Figure 6A:
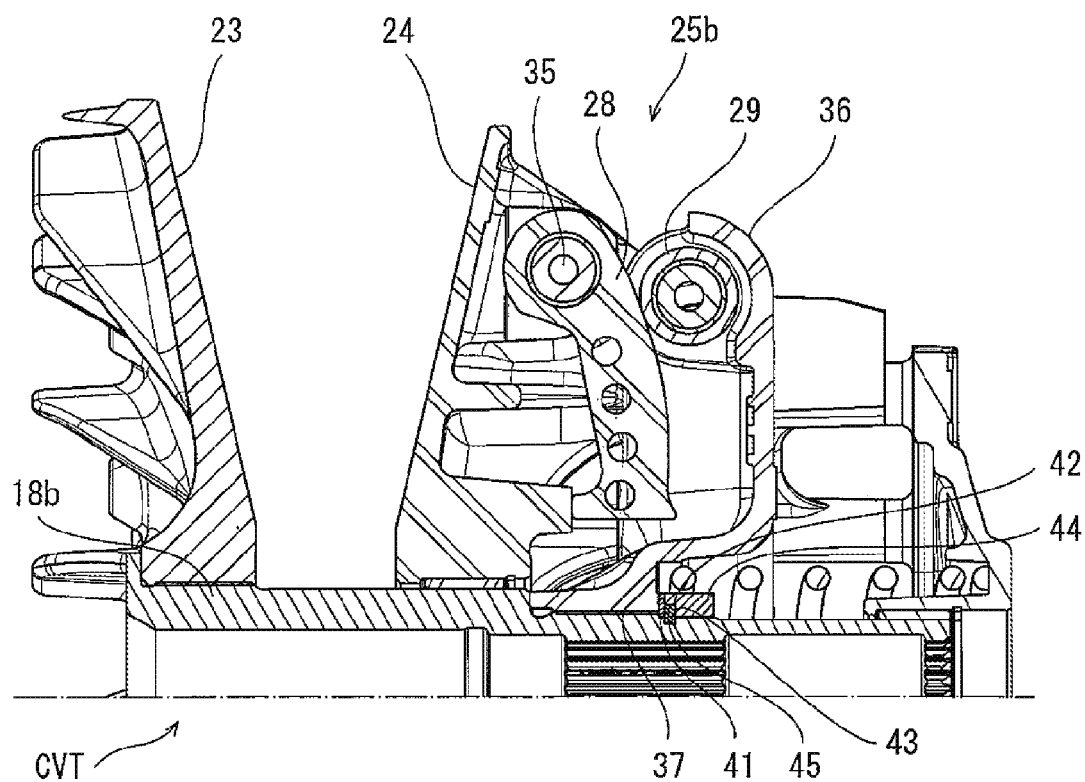
FIG. 6A is an enlarged cross-sectional view of the periphery of a portion at which a spider and a drive shaft of a continuously variable transmission according to a third embodiment are fastened.
Figure 6B:
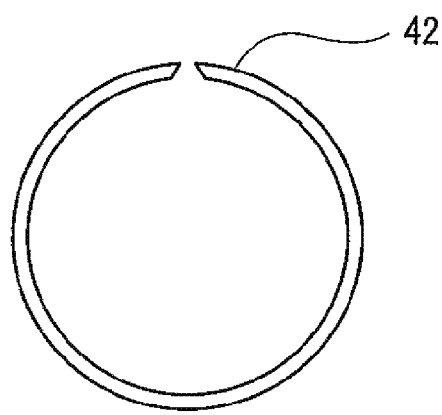
FIG. 6B is a front view of a retaining member in the continuously variable transmission of FIG. 6A.

The continuously variable transmission CVT according to the third embodiment will be described with reference to FIGS. 6A and 6B. FIG. 6A illustrates a cross-sectional view of a drive-pulley thrust generating mechanism 25b of the third embodiment. In FIG. 6A, only the shaft sleeve 18b of the drive shaft 18 is illustrated, and the main body 18a is omitted. In the third embodiment, the spider 36 is fixed to the shaft sleeve 18b of the drive shaft 18 through screwing. As illustrated in FIG. 6A, a washer 41 and a retaining member 42 are provided at the position adjacent to the spider 36 in the axial direction of the drive shaft 18. FIG. 6B illustrates a front view of the retaining member 42 of the present embodiment. In the present embodiment, the retaining member 42 is constituted by a circlip having an annular shape in which a part in the circumferential direction is cut away. The washer 41 and the retaining member 42 are disposed adjacent to each other in the axial direction so as to abut on each other in the axial direction of the drive shaft 18.

In the shaft sleeve 18b of the drive shaft 18, a groove 43 is formed along the circumferential direction on the outer circumferential surface on the radially outer side. A part of the retaining member 42 on an inner side in the radial direction is embedded in the groove 43. Since a part of the retaining member 42 on the inner side in the radial direction is embedded in the groove 43, the retaining member 42 is fixed in the axial direction. A ring member 44 is provided at a position on an outer side of the retaining member 42 in the radial direction so as to cover an outer peripheral surface of the retaining member 42 in the radial direction. The ring member 44 has an annular shape. A recess 45 in which an inner end surface in the radial direction is recessed outward in the radial direction is formed at a part of the ring member 44 in the axial direction. A part of the retaining member 42 on an outer side in the radial direction is inserted into the recess 45. The ring member 44 is fixed to the shaft sleeve 18b of the drive shaft 18 in the axial direction and the circumferential direction through interference fitting at a portion other than the portion covering the retaining member 42 in the axial direction.

When the spider 36 moves in the direction in which the screwing is loosened in the axial direction, the spider 36 abuts on the washer 41. Since the washer 41 is disposed adjacent to the retaining member 42, the retaining member 42 prevents the spider 36 from moving through the washer 41. Since a part of the retaining member 42 on the inner side in the radial direction is embedded in the groove 43, the retaining member 42 is fixed in the axial direction. Therefore, it is possible to reliably prevent the spider 36 from further moving in the axial direction.

Since the washer 41 is also disposed adjacent to the ring member 44, the ring member 44 prevents the spider 36 from moving through the washer 41. Since the ring member 44 is fixed to the shaft sleeve 18b of the drive shaft 18 through interference fitting, the ring member 44 is fixed in the axial direction. Therefore, it is possible to reliably prevent the spider 36 from further moving in the axial direction by the ring member 44.

Since the retaining member 42 is inserted into the recess 45 of the ring member 44, the outer side of the retaining member 42 in the radial direction is covered with the ring member 44, and thus, it is possible to inhibit the retaining member 42 from being detached from the drive shaft outward in the radial direction. Therefore, it is possible to position the retaining member 42 at the portion at which the spider 36 is prevented from moving in the axial direction, and it is possible to reliably prevent the spider 36 from moving in the axial direction.

Since the washer 41 is disposed between the spider 36 and the retaining member 42 in the axial direction, even though the spider 36 moves in the direction in which the screwing is loosened in the axial direction and the retaining member 42 is pushed by the spider 36, the washer 41 takes charge of a part of a load, and thus, it is possible to suppress the load applied to the retaining member 42. Similarly, since the washer 41 is disposed between the spider 36 and the ring member 44 in the axial direction, even though the spider 36 moves in the direction in which the screwing is loosened in the axial direction and the ring member 44 is pushed by the spider 36, the washer 41 takes charge of a part of the load, it is possible to suppress the load applied to the ring member 44.

Fourth Embodiment

Next, a continuously variable transmission according to a fourth embodiment will be described. The description of portions having the same configurations as those in the first embodiment to the third embodiment are omitted, and only different portions are described. The fourth embodiment is different from the third embodiment in that loosening of the spider 36 is prevented by a retaining member constituted by a split ring split into a plurality of portions in the circumferential direction.

Figure 7A:
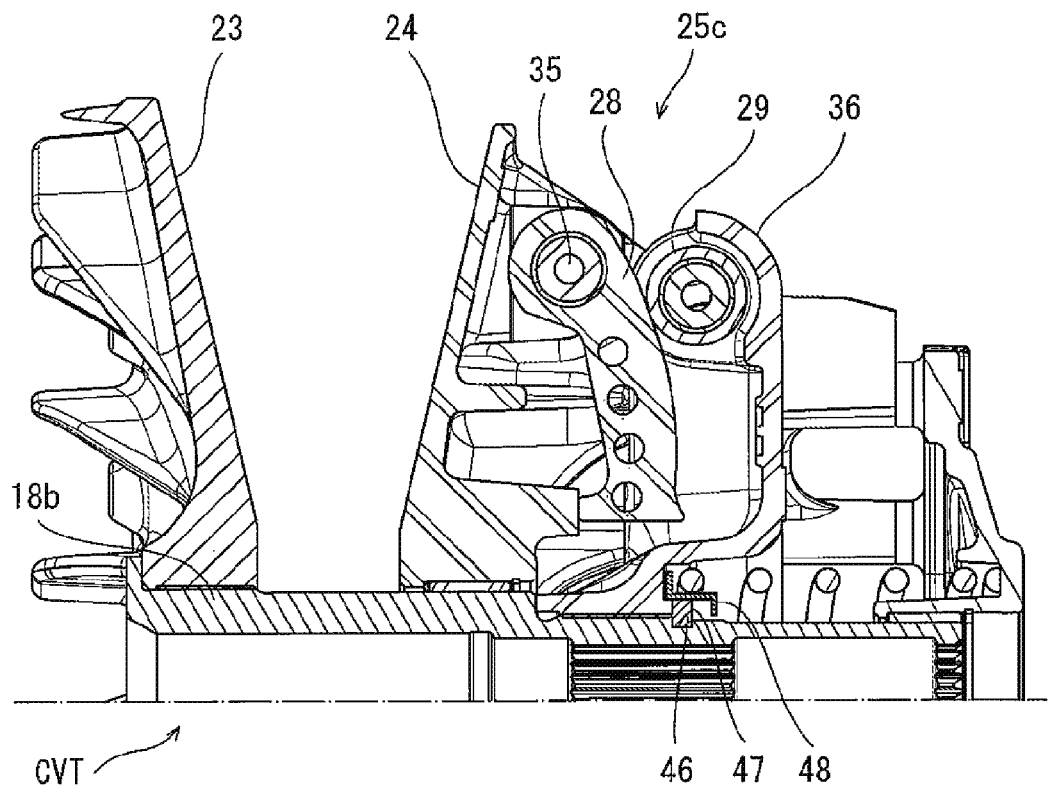
FIG. 7A is an enlarged cross-sectional view of the periphery of a portion at which a spider and a drive shaft of a continuously variable transmission according to a fourth embodiment are fastened.

The continuously variable transmission CVT according to the fourth embodiment will be described with reference to FIGS. 7A and 7B. FIG. 7A illustrates a cross-sectional view of a drive-pulley thrust generating mechanism 25c of the fourth embodiment. In FIG. 7A, only the shaft sleeve 18b of the drive shaft 18 is illustrated, and the main body 18a is omitted. In the fourth embodiment, the spider 36 is fixed to the shaft sleeve 18b of the drive shaft 18 by screwing. As illustrated in FIG. 7A, a groove 46 is formed along the circumferential direction on the outer side of the drive shaft in the radial direction at the position adjacent to the spider 36 in the axial direction of the drive shaft 18. The groove 46 is formed at a position adjacent to the spider 36 on a side that the screwing of the spider 36 is loosened in the axial direction. The split ring 47 is disposed such that a part on the inner side in the radial direction is inserted into the groove 46.

Figure 7B:
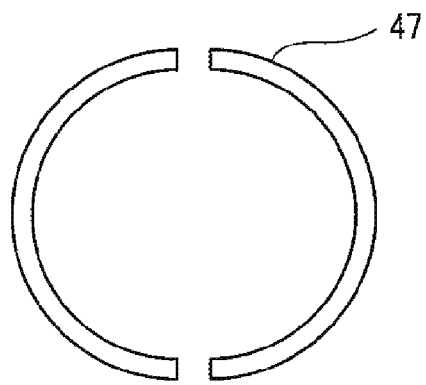
FIG. 7B is a front view of a split ring in the continuously variable transmission of FIG. 7A.

FIG. 7B illustrates a front view of the split ring 47. In the present embodiment, the split ring 47 can be split into two in the circumferential direction. Since the groove 46 is formed at the position adjacent to the spider 36 in the axial direction, the split ring 47 is disposed at the position adjacent to the spider 36 in the axial direction.

A stopper member 48 is disposed at a position on an outer side of the split ring 47 in the radial direction so as to cover the outer peripheral surface of the split ring 47 in the radial direction. Since the stopper member 48 covers the split ring 47 at the position on the outer side of the split ring 47 in the radial direction, the stopper member 48 regulates the displacement of the split ring 47 to the outer side in the radial direction. The stopper member 48 is attached to a side surface of the spider 36 on the load direction side.

When the spider 36 moves in the direction in which the screwing is loosened in the axial direction, the spider 36 abuts on the split ring 47. Since the split ring 47 is fixed by inserting a part on the inner side in the radial direction into the groove 46, the split ring 47 is prevented from moving in the axial direction. Therefore, when the spider 36 abuts on the split ring 47, even though the spider 36 moves further in the direction in which the screwing is loosened in the axial direction, since the split ring 47 abuts on the spider 36 in a state of being fixed to the drive shaft 18 in the axial direction, it is possible to prevent the spider 36 from further moving in the axial direction.

Since the split ring 47 is split into two in the circumferential direction, even though a thickness of the split ring 47 increases and the rigidity thereof is improved, it is possible to easily assemble the split ring 47 to the drive shaft 18. Therefore, it is possible to provide a configuration for preventing the loosening of the spider 36 which can be easily attached to the drive shaft 18 while reliably preventing the movement of the spider 36 in the axial direction by the split ring 47 with high rigidity.

Fifth Embodiment

Next, a continuously variable transmission according to a fifth embodiment will be described. The description of portions having the same configurations as those in the first embodiment to the fourth embodiment are omitted, and only different portions are described. The fifth embodiment is different from the fourth embodiment in that a sleeve is disposed between the spider 36 and the drive shaft 18 and includes a stopper that prevents the spider 36 from moving.

Figure 8:
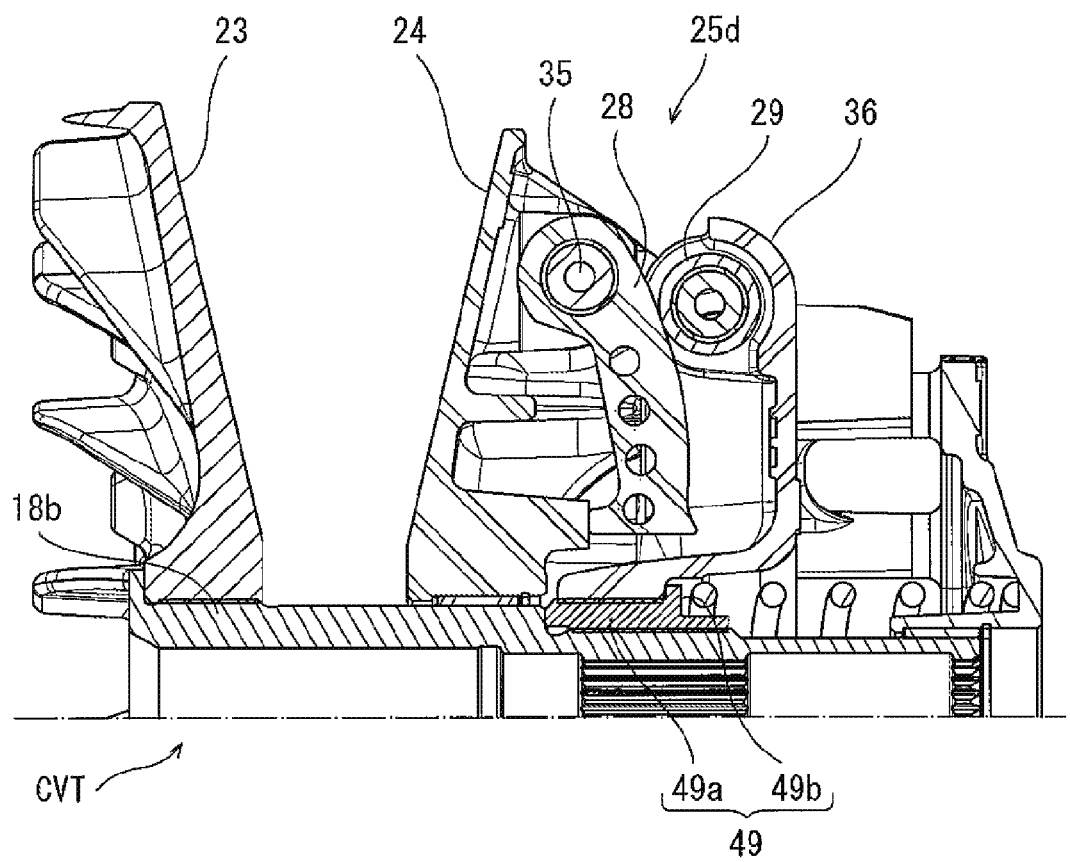
FIG. 8 is an enlarged cross-sectional view of a portion at which a spider and a drive shaft of a continuously variable transmission according to a fifth embodiment are fastened through a sleeve.

The continuously variable transmission CVT according to the fifth embodiment will be described with reference to FIG. 8. FIG. 8 illustrates a cross-sectional view of a drive-pulley thrust generating mechanism 25d of the fifth embodiment. In FIG. 8, only the shaft sleeve 18b of the drive shaft 18 is illustrated, and the main body 18a is omitted. In the fifth embodiment, a sleeve 49 is fixed to the shaft sleeve 18b of the drive shaft 18 in the circumferential direction and the axial direction through screwing, and the spider 36 is fixed onto an outer surface of the sleeve 49 in the circumferential direction and the axial direction through screwing. Accordingly, the sleeve 49 is disposed at an inner peripheral position of the spider 36. A length of a portion at which the sleeve 49 is screwed to the shaft sleeve 18b of the drive shaft 18 is longer than a length of a portion at which the spider 36 is screwed to the sleeve 49. In the present embodiment, the drive shaft 18 including the shaft sleeve 18b is made of iron. The sleeve 49 is made of iron.

The sleeve 49 includes a sleeve main body 49a and a stopper 49b that protrudes outward from the sleeve main body 49a in the radial direction. In the sleeve 49, the stopper 49b is provided at a position on the load direction side to which the load is applied by the centrifugal weights 28 relative to the position at which the spider 36 is fixed through screwing in the axial direction. That is, the stopper 49b is provided at the position on a side to which the screwing of the spider 36 is loosened, from the spider 36. In the present embodiment, the spider 36 is attached to the sleeve 49 such that the stopper 49b abuts on the spider 36.

When the spider 36 attempts to move in the direction in which the screwing is loosened in the axial direction, since the spider 36 and the stopper 49b abut on each other, the spider 36 cannot further move in the direction in which the screwing is loosened in the axial direction, and the stopper 49b prevents the spider 36 from moving in the axial direction. In the present embodiment, since the stopper 49a is formed as a part of the sleeve 49, the stopper 49b reliably prevents the spider 36 from moving.

A length of the portion at which the sleeve 49 and the shaft sleeve 18b of the drive shaft 18 are screwed to each other is longer than a length of the portion at which the spider 36 and the sleeve 49 are screwed to each other, and thus, the sleeve 49 is reliably fastened to the shaft sleeve 18b. In the present embodiment, since the sleeve 49 is firmly fastened to the shaft sleeve 18b, the stopper 49b does not move in the axial direction, and it is possible to reliably prevent the spider 36 from moving in the axial direction. As for the movement of the sleeve 49 in the axial direction, since the length of the portion in the axial direction at which the sleeve 49 is fastened by being screwed to the shaft sleeve 18b at the inner peripheral position of the spider 36 can be set to be long, it is possible to firmly fasten the sleeve 49 and the shaft sleeve 18b. Therefore, it is possible to inhibit the sleeve 49 from moving to the drive shaft 18 in the axial direction.

Since the drive shaft 18 is made of iron and the sleeve 49 is made of iron, it is possible to inhibit the sleeve 49 from being easily loosened due to a difference in thermal expansion at the portion at which the sleeve 49 and the drive shaft 18 are fastened by a screw. Therefore, it is possible to inhibit the sleeve 49 from moving when the continuously variable transmission CVT is heated to a high temperature. Accordingly, even when the sleeve 49 has the high temperature, it is possible to reliably inhibit the spider 36 from moving by the stopper 49b of the sleeve 49. Therefore, it is possible to provide the continuously variable transmission CVT with excellent heat resistance.

Sixth Embodiment

Next, a continuously variable transmission according to a sixth embodiment will be described. The description of portions having the same configurations as those in the first embodiment to the fifth embodiment are omitted, and only different portions are described. The sixth embodiment is different from the fifth embodiment in that a stopper is provided on the shaft sleeve of the drive shaft.

Figure 9:
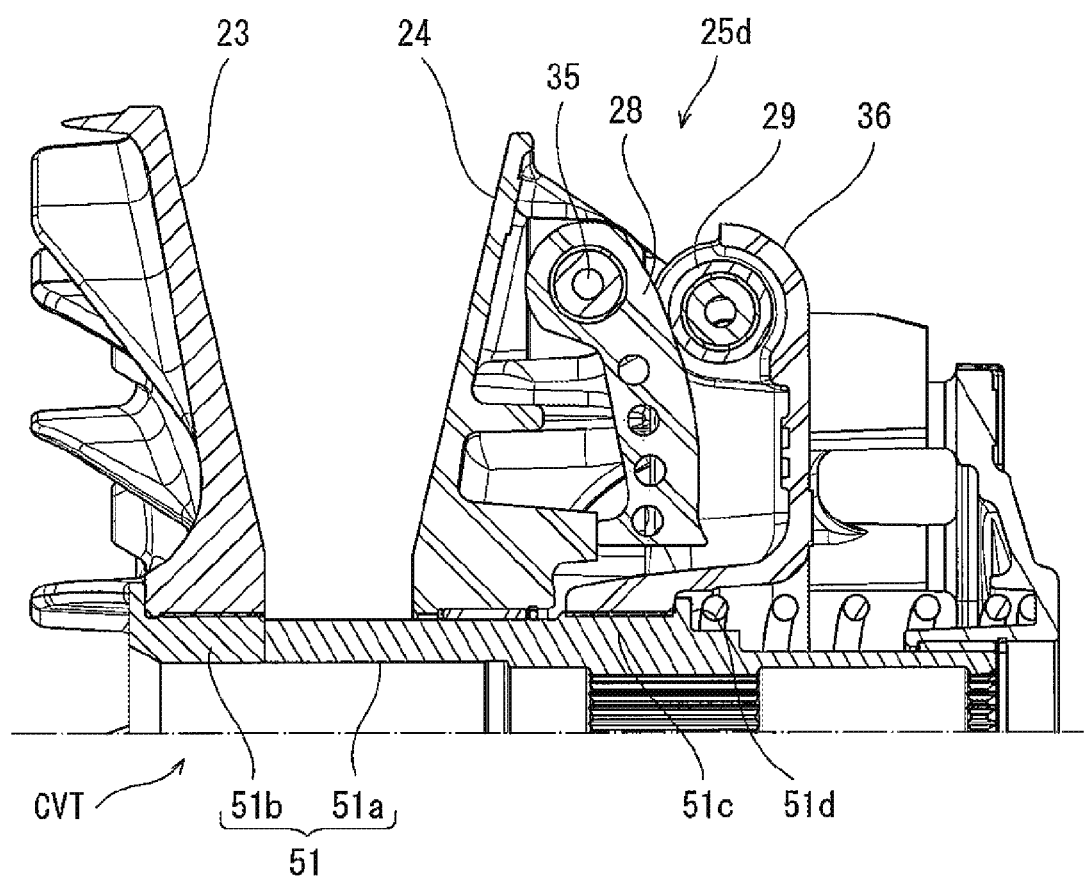
FIG. 9 is an enlarged cross-sectional view of the periphery of a portion at which a spider and a drive shaft of a continuously variable transmission according to a sixth embodiment are fastened through a sleeve.

A continuously variable transmission CVT according to the sixth embodiment will be described with reference to FIG. 9. FIG. 9 illustrates a cross-sectional view of a drive-pulley thrust generating mechanism 25e of the sixth embodiment. In the sixth embodiment, a shaft sleeve (sleeve) 51 is formed on an outer side of the drive shaft 18 in the radial direction over substantially the entire drive-pulley thrust generating mechanism 25e. In the present embodiment, since the shaft sleeve 51 is provided on the outer side of the drive shaft 18 in the radial direction, the fixed sheave 23 and the movable sheave 24 are attached to the shaft sleeve 51. The fixed sheave 23 is fixed to the shaft sleeve 51 in the axial direction and the circumferential direction so as not to move to the shaft sleeve 51 in the axial direction. The movable sheave 24 is configured to be relatively movable in the axial direction while being fixed to the shaft sleeve 51 in the circumferential direction.

In the present embodiment, the shaft sleeve 51 is configured to be split in the axial direction. The shaft sleeve 51 is configured such that a portion to which the fixed sheave 23 is attached can be split from a portion including a portion to which the movable sheave 24 is attached. In the shaft sleeve 51, the portion including the portion to which the movable sheave 24 is attached is referred to as a movable-sheave-side shaft sleeve 51a, and the portion including the portion to which the fixed sheave 23 is attached is referred to as a fixed-sheave-side shaft sleeve 51b.

In the present embodiment, the spider 36 is attached to the movable-sheave-side shaft sleeve 51a in the shaft sleeve 51. The spider 36 is fixed to the movable-sheave-side shaft sleeve 51a by a screw in the axial direction and the circumferential direction.

The movable-sheave-side shaft sleeve 51a includes a movable-sheave-side shaft sleeve main body 51c and a stopper 51d that protrudes outward in the radial direction from the movable-sheave-side shaft sleeve main body 51c at the position adjacent to the spider 36 in the axial direction. The stopper 51c is provided at the position on the load direction side to which the load is applied by the centrifugal weights 28 rather than the position at which the movable-sheave-side shaft sleeve main body 51c and the spider 36 are fixed through screwing in the axial direction. In the present embodiment, the spider 36 is attached to the movable-sheave-side shaft sleeve 51a such that the spider 36 and the stopper 51d abut on with each other.

Since the spider 36 is fastened to the movable-sheave-side shaft sleeve 51a by a screw, the spider 36 is likely to move in the axial direction due to the force acting on the spider 36 in the circumferential direction. When the spider 36 attempts to move in the direction in which the screwing is loosened in the axial direction, since the spider 36 and the stopper 51d abut on each other, the spider 36 cannot further move in the direction in which the screwing is loosened in the axial direction, and the stopper 51d prevents the spider 36 from moving to the load direction side in the axial direction. In the present embodiment, since the stopper 51d is formed as a part of the movable-sheave-side shaft sleeve 51a, the stopper 51d reliably prevents the spider 36 from moving to the load direction side by abutting on the spider 36. Therefore, it is possible to inhibit the spider 36 from further moving to the load direction side by abutting on the stopper 51d.

In the present embodiment, the continuously variable transmission CVT has a long portion at which the shaft sleeve 51 and the drive shaft 18 abut on each other. Therefore, it is possible to firmly fasten the shaft sleeve 51 and the drive shaft 18. Therefore, it is possible to reliably inhibit the shaft sleeve 51 from moving to the drive shaft 18 in the axial direction. Since the shaft sleeve 51 is inhibited from moving in the axial direction, it is possible to inhibit the stopper 51d from moving in the axial direction. Therefore, the stopper 51d can more reliably inhibit the spider 36 from moving.

In the present embodiment, since the shaft sleeve 51 can be split into two, that is, the movable-sheave-side shaft sleeve 51a and the fixed-sheave-side shaft sleeve 51b in the axial direction, the fixed-sheave-side shaft sleeve 51b together with the fixed sheave 23 is removed from the drive-pulley thrust generating mechanism 25e, and thus, it is possible to detach the portion of the shaft sleeve 51 to which the fixed sheave 23 is attached from the portion including the portion to which the movable sheave 24 is attached. When the fixed sheave 23 is removed from the drive-pulley thrust generating mechanism 25e, the movable sheave 24 is pulled out along the axial direction of the drive shaft 18, and thus, it is possible to easily remove the movable sheave 24 from the drive-pulley thrust generating mechanism 25e. Thus, it is possible to remove the fixed sheave 23 and the movable sheave 24 from the drive-pulley thrust generating mechanism 25e without removing the spider 36 from the drive-pulley thrust generating mechanism 25e. Accordingly, the abutting portions of the centrifugal weights 28 and the spider 36 can be accessed without removing the spider 36 from the drive-pulley thrust generating mechanism 25e, and it is possible to improve the maintainability.

Seventh Embodiment

Next, a continuously variable transmission according to a seventh embodiment will be described. The description of portions having the same configurations as those in the first embodiment to the sixth embodiment are omitted, and only different portions are described. The seventh embodiment is different from the sixth embodiment in that a first sleeve that prevents the spider 36 from moving and a second sleeve that fastens the spider 36 through screwing are provided on the outer side of the drive shaft in the radial direction.

Figure 10:
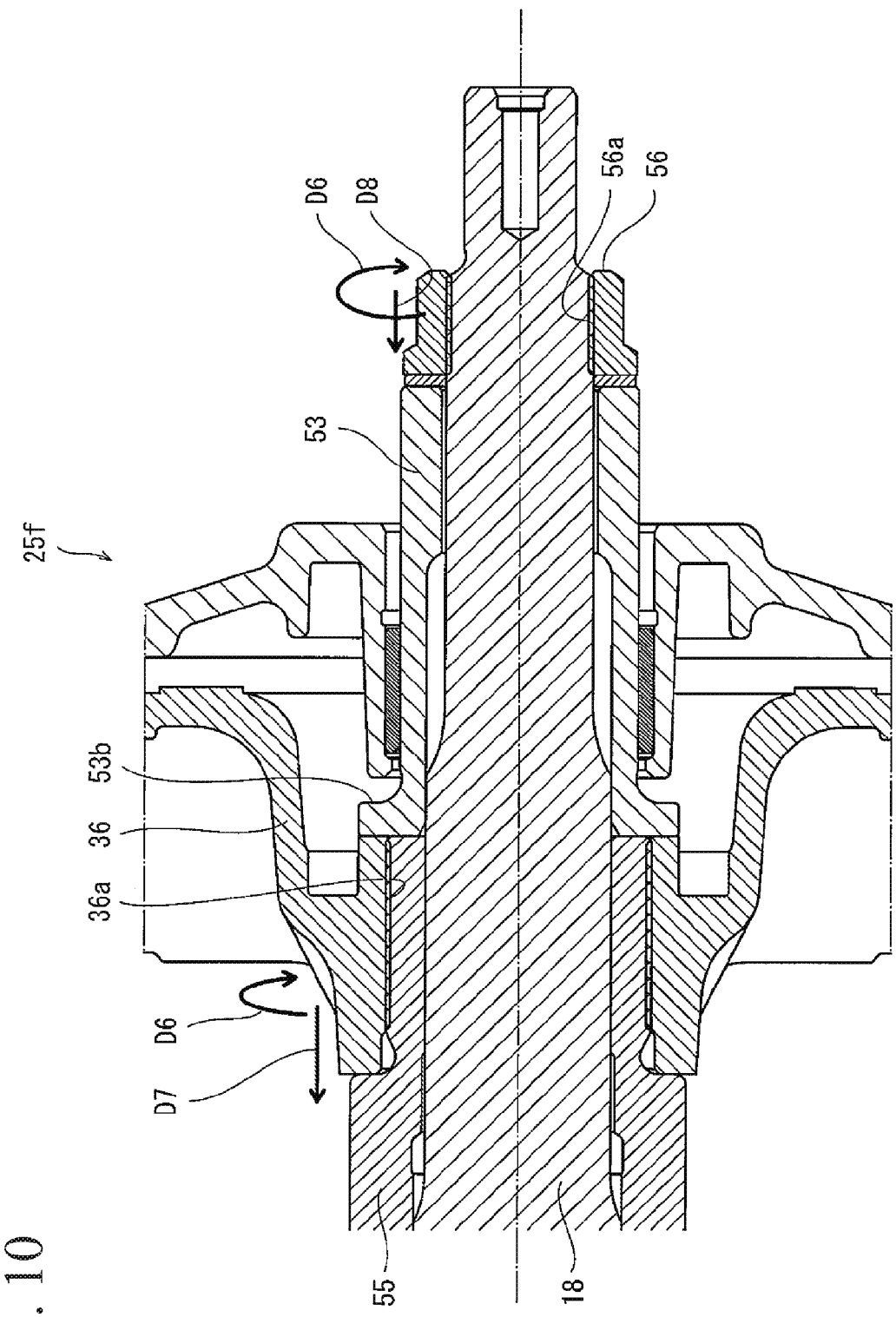
FIG. 10 is an enlarged cross-sectional view of the periphery of a portion at which a spider and a drive shaft of a continuously variable transmission according to a seventh embodiment are fastened through a second sleeve.

The continuously variable transmission CVT according to the seventh embodiment will be described with reference to FIG. 10. FIG. 10 illustrates a cross-sectional view of a drive-pulley thrust generating mechanism 25f of the seventh embodiment. FIG. 10 illustrates a main part of the drive-pulley thrust generating mechanism 25f.

In the seventh embodiment, a first sleeve 53 that covers the outer side of the drive shaft 18 in the radial direction is provided at the position on the load direction side to which the load is applied by the centrifugal weights 28 in the drive shaft 18. The first sleeve 53 is attached to the drive shaft 18 so as not to be relatively rotatable at a part on the load direction side in the axial direction through spline engagement. For example, a projection may be formed on an outer peripheral surface of the drive shaft 18 in the radial direction to form a spline shaft, and a spline hole may be formed on an inner peripheral surface of the first sleeve 53 in the radial direction. The spline shaft and the spline hole may be engaged with each other, and spline engagement may be performed. The spline engagement may be performed at a position on the load direction side of a position at which the first sleeve 53 and the drive shaft 18 abut, or may be performed at a position on an opposite side of the load direction.

A second sleeve 55 that covers the outer side of the drive shaft 18 in the radial direction is provided at a position opposite to the load direction side from the first sleeve 53 in the axial direction. In the present embodiment, similarly to the first sleeve 53, the second sleeve 55 is attached to the drive shaft 18 so as not to be relatively rotatable through spline engagement. Although it has been described in the present embodiment that the second sleeve 55 is attached to the drive shaft 18 through spline engagement, the present invention is not limited to the above-described embodiment. The second sleeve 55 may be attached to the drive shaft 18 through screwing.

The first sleeve 53 and the second sleeve 55 are arranged on the outer side the drive shaft 18 in the radial direction in a state of abutting on each other in the axial direction. In the axial direction, a nut 56 is provided on the outer side of the drive shaft 18 in the radial direction at a position on the load direction side from the first sleeve 53. The nut 56 is fixed to the drive shaft 18 through screwing while abutting on the first sleeve 53.

The first sleeve 53 and the second sleeve 55 are arranged in the axial direction in a state of abutting on each other, and the nut 56 is fastened to the drive shaft 18 in the direction opposite to the load direction side through screwing in a state of abutting on the first sleeve 53. Thus, the first sleeve 53 and the second sleeve 55 are pushed in the direction opposite to the load direction side, and the first sleeve 53 and the second sleeve 55 are fixed in the axial direction.

The spider 36 is attached to the second sleeve 55 on the outer side of the second sleeve 55 in the radial direction. The spider 36 is fixed to the second sleeve 55 in the axial direction and the circumferential direction through screwing. The second sleeve 55 is fixed to the drive shaft 18 at a position opposite to the load direction side from the spider 36 and an inner peripheral position of the spider 36 and at a position on the outer side of the drive shaft 18 in the radial direction.

The spider 36 is screwed into the second sleeve 55, and includes a first screw 36a which advances in a first direction D7 in the axial direction of the drive shaft 18 when the spider rotates relative to the drive shaft 18 in one direction D6 of a circumferential direction. Thus, the spider 36 is fastened to the drive shaft 18 by the first screw 36a. Similarly to the spider 36, the nut 56 is screwed to the drive shaft 18, and includes a second screw 56a which advances in a second direction D8 in the axial direction of the drive shaft 18 when the nut rotates relative to the drive shaft 18 in one direction D6 of the circumferential direction. Accordingly, the nut 56 is fastened to the drive shaft 18 by the second screw 56a. Since the spider 36 is fastened to the second sleeve 55 by the first screw 36a and the nut 56 is fastened to the drive shaft 18 by the second screw 56a, it is possible to reliably fasten the spider 36 to the second sleeve 55, and it is possible to reliably fasten the nut 56 to the drive shaft 18. In the present embodiment, the first direction D7 and the second direction D8 are the same direction.

The first sleeve 53 includes a first sleeve body 53a and a stopper 53b that protrudes outward in the radial direction from the first sleeve body 53a at an end opposite to the load direction side in the axial direction. The second sleeve 55 abuts on the first sleeve 53 at the stopper 53b. In the axial direction, an end on the load direction side of the second sleeve 55 is disposed at a position which is slightly close to the load direction side than the end on the load direction side of the spider 36. Therefore, the first sleeve 53 and the second sleeve 55 reliably abut on each other. The first sleeve 53 is attached to the drive shaft 18 such that the stopper 53b is disposed at a position adjacent to the spider 36 in the axial direction.

Since the spider 36 is fastened to the second sleeve 55 by a screw, the spider is likely to move in the axial direction according to the force acting on the spider 36 in the circumferential direction. When the spider 36 moves in the direction in which the screwing is loosened in the axial direction, the spider 36 and the stopper 53b abut on each other. When the spider 36 and the stopper 53b abut on each other, the spider 36 cannot move further in the direction in which the screwing is loosened in the axial direction, and the stopper 53b prevents the spider 36 from moving toward the load direction side in the axial direction. In the present embodiment, since the stopper 53b is formed as a part of the first sleeve 53, the stopper 53b reliably prevents the spider 36 from moving to the load direction side by abutting on the spider 36. Therefore, when the end on the load direction side of the spider 36 abuts on the stopper 53b, it is possible to inhibit the spider 36 from further moving to the load direction side.

The stopper 53b abuts on the end on the load direction side of the second sleeve 55 in the axial direction and the first sleeve 53 is supported by the nut 56 in the axial direction. Thus, by fastening the nut 56, the first sleeve 53 and the second sleeve 55 are pushed against each other. The first sleeve 53 and the second sleeve 55 surround the spider 36. As a result, it is possible to reliably prevent the spider 36 from moving.

Since the first sleeve 53 is attached to the drive shaft 18 so as not to be relatively rotatable through spline engagement, even though the spider 36 rotates relative to the drive shaft 18 and moves to the load direction side, the first sleeve 53 does not rotate relative to the drive shaft 18. Since the first sleeve 53 is disposed between the spider 36 and the nut 56 in the axial direction, even though the spider 36 rotates around the axis of the drive shaft 18, the rotation of the spider 36 is not transmitted to the nut 56. Accordingly, it is possible to inhibit the nut 56 from being loosened due to the rotation of the spider 36 in the circumferential direction.

In the present embodiment, since the first direction D7 in which the spider 36 advances by the first screw 36a when the spider 36 rotates relative to the drive shaft 18 in one direction D6 of the circumferential direction and the second direction D8 in which the nut 56 advances by the second screw 56a when the nut 56 rotates relative to the drive shaft 18 in one direction (the same direction as the rotation direction of the spider 36) of the circumferential direction are the same direction, the direction of the screw formed at the second sleeve 55 and the direction of the screw formed at the drive shaft 18 are the same, and it is possible to easily form the screws. Therefore, it is possible to easily manufacture the continuously variable transmission CVT, and it is possible to reduce the manufacturing cost of the continuously variable transmission CVT.

Eighth Embodiment

Next, a continuously variable transmission according to an eighth embodiment will be described. The description of portions having the same configurations as those in the first embodiment to the seventh embodiment are omitted, and only different portions are described. The first direction D7 in which the spider 36 advances when the spider 36 rotates and the second direction D8 in which the nut 56 advances when the nut 56 rotates are the same direction in the seventh embodiment, whereas the direction in which the spider advances when the spider rotates and the direction in which the nut advances when the nut rotates are opposite directions in the eighth embodiment. In this regard, the eight embodiment is different from the seventh embodiment.

Figure 11:
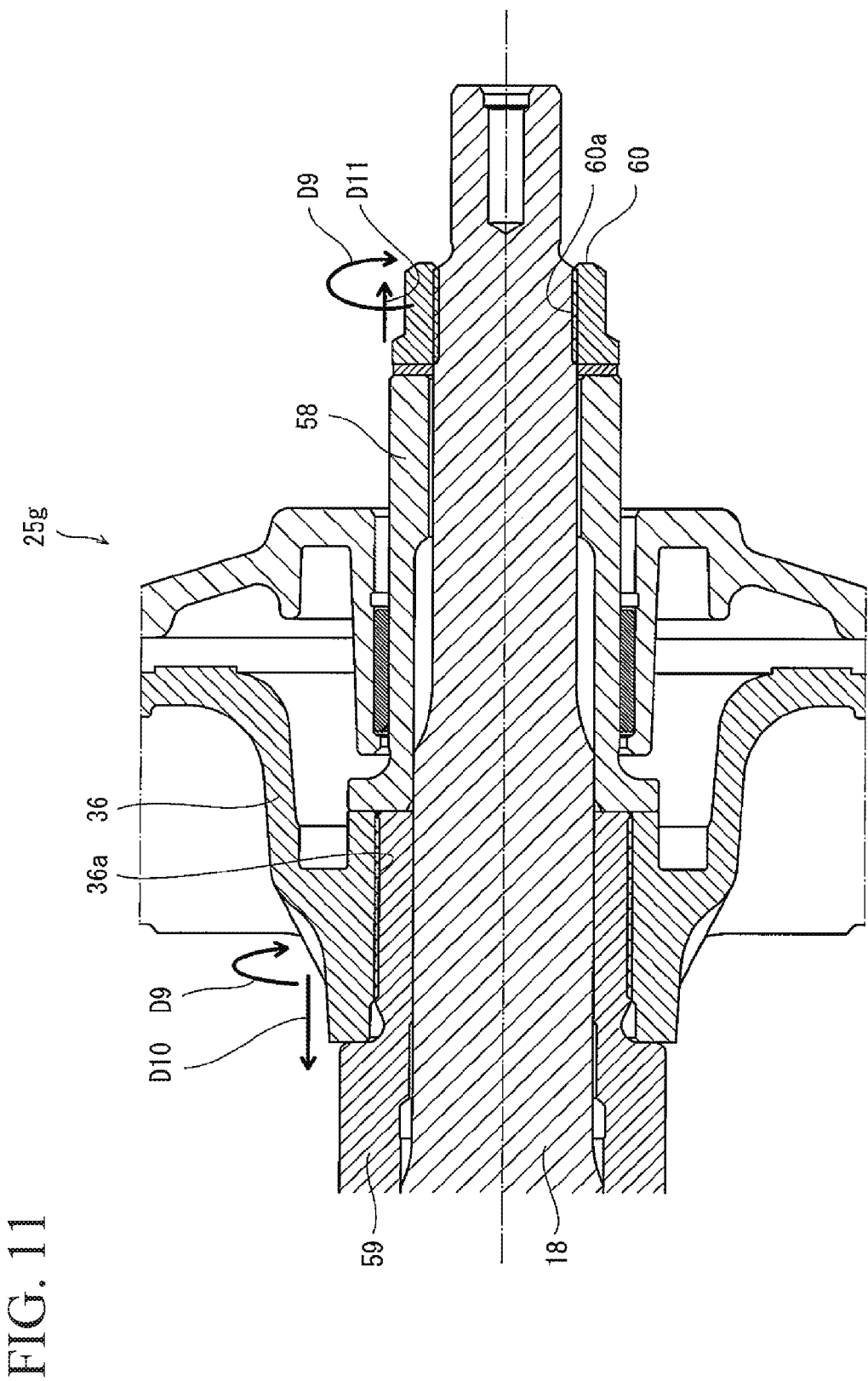
FIG. 11 is an enlarged cross-sectional view of the periphery of a portion at which a spider and a drive shaft of a continuously variable transmission according to an eighth embodiment are fastened through a second sleeve.
Figure 12:
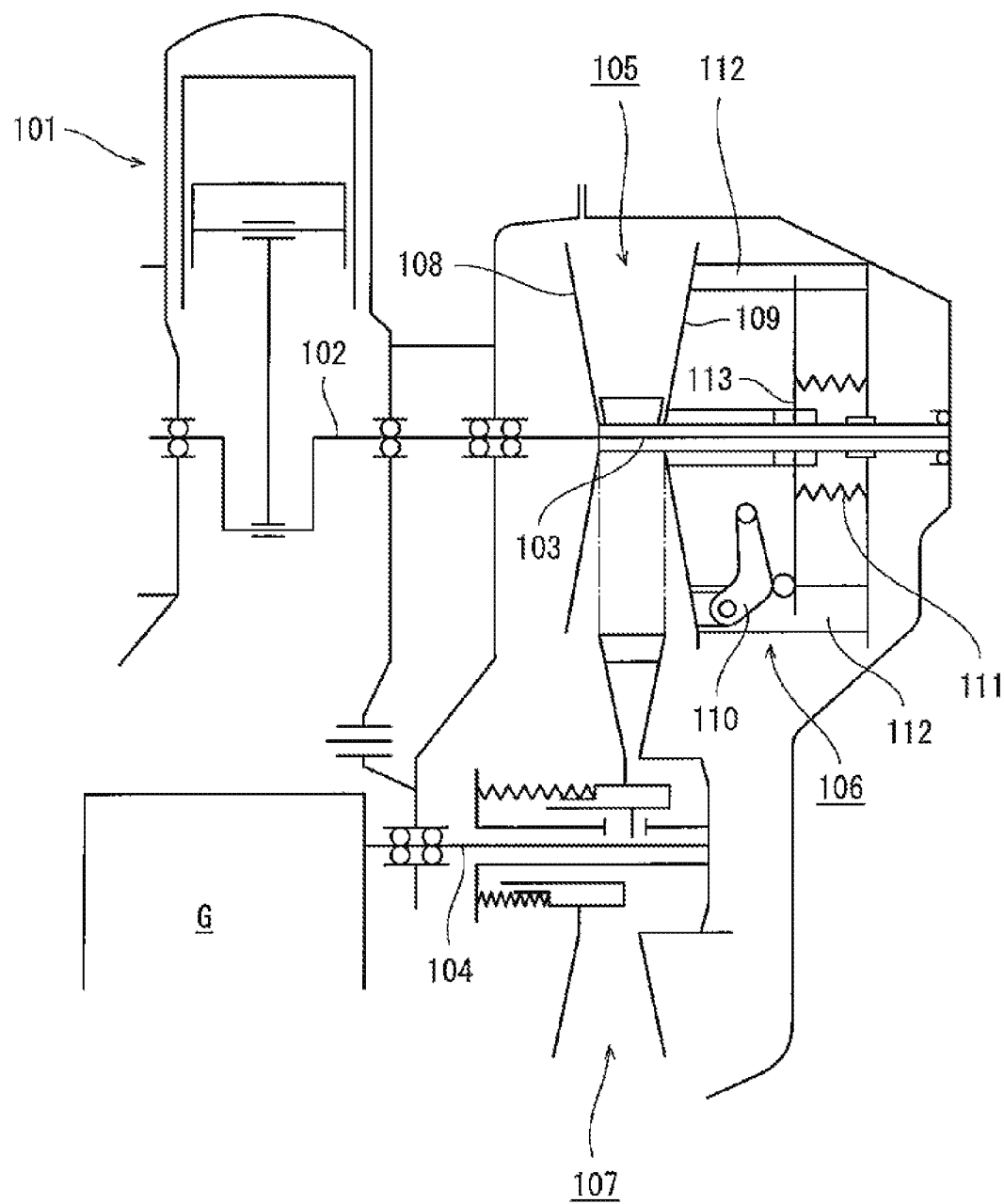
FIG. 12 is a schematic cross-sectional view of a vehicle power transmission mechanism using a continuously variable transmission of the related art.

The continuously variable transmission CVT according to the eighth embodiment will be described with reference to FIG. 11. FIG. 11 illustrates a cross-sectional view of a drive-pulley thrust generating mechanism 25g of the eighth embodiment. FIG. 11 illustrates a main part of the drive-pulley thrust generating mechanism 25g.

A first sleeve 58 that covers the outer side of the drive shaft 18 in the radial direction is provided around the portion on the load direction side of the drive shaft 18. A second sleeve 59 that covers the outer side of the drive shaft 18 in the radial direction is provided at a position opposite to the load direction side from the first sleeve 58 in the axial direction. The first sleeve 58 and the second sleeve 59 are arranged on the outer side of the drive shaft 18 in the radial direction in a state of abutting on each other in the axial direction. A nut 60 is provided on the outer side of the drive shaft 18 in the radial direction at a position on the load direction side from the first sleeve 58 in the axial direction. The nut 60 is fixed to the drive shaft 18 through screwing in a state of abutting on the first sleeve 58.

The spider 36 is attached to the second sleeve 59 on the outer side of the second sleeve 59 in the radial direction. The spider 36 is fixed to the second sleeve 59 in the axial direction and the circumferential direction through screwing. The second sleeve 59 is fixed to the drive shaft 18 at a position opposite to the load direction side from the spider 36 and an inner peripheral position of the spider 36 and at a position on the outer side of the drive shaft 18 in the radial direction.

The spider 36 is screwed into the second sleeve 59, and includes a first screw 36b which advances in a first direction D10 in the axial direction of the drive shaft 18 when the spider rotates relative to the drive shaft 18 in one direction D9 of the circumferential direction. Therefore, the spider 36 is fastened to the drive shaft 18 by the first screw 36b. The nut 60 is screwed into the drive shaft 18, and includes a second screw 60a which advances in a second direction D1l of the axial direction of the drive shaft 18 when the nut rotates relative to the drive shaft 18 in one direction D9 of the circumferential direction. Therefore, the nut 60 is fastened to the drive shaft 18 by the second screw 60a. In this embodiment, when the nut 60 is tightened and the first sleeve 58 and the second sleeve 59 are fixed in the axial direction, the nut 60 is rotated in the direction opposite to the D9 direction, and the nut 60 is moved in the direction toward the first sleeve 58 and the second sleeve 59. Since the spider 36 is fastened to the second sleeve 59 by the first screw 36b and the nut 60 is fastened to the drive shaft 18 by the second screw 60a, the spider 36 can be reliably fastened to the second sleeve 59, and the nut 60 can be reliably fastened to the drive shaft 18. In the present embodiment, the first direction D10 and the second direction D1l are opposite directions.

In the present embodiment, the first direction D10 in which the spider 36 advances by the first screw 36b when the spider 36 rotates relative to the drive shaft 18 in one direction D9 of the circumferential direction and the second direction D11 in which the nut 60 advances by the second screw 60a when the nut 60 rotates relative to the drive shaft 18 in one direction (the same direction as the rotation direction of the spider 36) of the circumferential direction are opposite directions. Accordingly, even when the spider 36 moves relative to the second sleeve 59 toward the load direction side in the axial direction by loosening the spider 36, the rotation of the spider 36 around the axis is transmitted to the first sleeve 58, the first sleeve 58 rotates relative to the drive shaft 18 in the same direction as the rotation of the spider 36 around the axis, and the rotation around the axis is transmitted to the nut 60, the nut 60 moves due to the rotation thereof in the direction opposite to the direction in which the spider 36 moves in the axial direction.

Thus, the nut 60 rotates to a side on which the nut is further fastened, thus, the first sleeve 58 and the nut 60 pushes against each other on the drive shaft 18. As a result, it is possible to inhibit the first sleeve 58 and the nut 60 from further moving toward the load direction side in the axial direction. That is, it is possible to inhibit the first sleeve 58 and the nut 60 from moving in the axial direction toward the side on which the screwing is loosened. Even though the rotation of the spider 36 around the axis is transmitted to the nut 60 through the first sleeve 58, it is possible to inhibit the nut 60 from moving in the axial direction due to the rotation.

In the seventh embodiment, since the first sleeve 53 and the drive shaft 18 are connected through spline engagement, the first sleeve 53 and the drive shaft 18 do not rotate relative to each other, and thus, the rotation of the spider 36 around the axis is not transmitted to the nut 56. However, in some designs, it is considered that the first sleeve 58 and the drive shaft 18 are not connected through spline engagement. Alternatively, it is also considered that the first sleeve 58 and the drive shaft 18 are connected through screwing. In such a case, when the first sleeve 58 rotates around the axis and the spider 36 rotates around the axis, it is considered that the rotation of the spider 36 is transmitted to the nut 60 through the first sleeve 58. In the present embodiment, since the first direction D10 in which the spider 36 advances when the spider 36 rotates in the D9 direction and the second direction D11 in which the nut 60 advances when the nut 60 rotates in the D9 direction are opposite directions, even though the first sleeve 58 and the drive shaft 18 are not connected through spline engagement or are connected through screwing, it is possible to inhibit the first sleeve 58 and the nut 60 from moving in the axial direction toward the side on which the screwing is loosened. Accordingly, it is possible to reliably inhibit the spider 36 from moving in the axial direction toward the side on which the screwing is loosened.

Other Embodiments

While it has been described in the aforementioned embodiments that the continuously variable transmission CVT is applied to the utility vehicle, the present invention is not limited to the above-described embodiments. The continuously variable transmission CVT may be applied to other vehicles such as a straddle-type vehicle.

What is claimed is:

1. A continuously variable transmission comprising:
a drive shaft that is driven to be rotated by driving a drive source;
a drive pulley that includes a fixed sheave which is attached to the drive shaft and is fixed to the drive shaft in an axial direction and a circumferential direction and a movable sheave which is fixed to the drive shaft in the circumferential direction and is relatively movable in the axial direction;
a driven shaft that is driven according to rotation of the drive shaft;
a driven pulley that is attached to the driven shaft;
a belt that is wound between the drive pulley and the driven pulley; and
a drive-pulley thrust generating mechanism that moves the movable sheave relative to the drive shaft on the drive shaft,
wherein the drive-pulley thrust generating mechanism includes a centrifugal weight that is rotatable relative to the movable sheave according to centrifugal force caused by the rotation of the drive shaft, a spider that includes an abutting portion on which the centrifugal weight abuts, is fixed to the drive shaft in the axial direction and the circumferential direction through screwing, and moves the movable sheave relative to the drive shaft in the axial direction according to rotation of the centrifugal weight, and a nut that is disposed adjacent to the spider in the axial direction at a position on a side on which the screwing of the spider is loosened, and is fixed to the drive shaft in the axial direction and the circumferential direction through screwing,
the spider is screwed to the drive shaft, includes a first screw that advances in one direction of the axial direction of the drive shaft when the spider rotates relative to the drive shaft in one direction of the circumferential direction, and is fastened to the drive shaft by the first screw,
the nut is screwed to the drive shaft, includes a second screw that advances in the other direction of the axial direction of the drive shaft when the nut rotates relative to the drive shaft in the one direction of the circumferential direction, and is fastened to the drive shaft by the second screw, and
the nut is disposed at a position that is, in the axial direction of the drive shaft, closer to the centrifugal weight than a farthest part of the spider from the centrifugal weight.

2. The continuously variable transmission according to claim 1, wherein
the spider includes, at its inner part as seen in a radial direction of the drive shaft, a recess that is recessed toward the centrifugal weight in the axial direction of the drive shaft, and
the nut is accommodated in the recess.

3. A continuously variable transmission comprising:
a drive shaft that is driven to be rotated by driving a drive source;
a drive pulley that includes a fixed sheave which is attached to the drive shaft and is fixed to the drive shaft in an axial direction and a circumferential direction and a movable sheave which is fixed to the drive shaft in the circumferential direction and is relatively movable in the axial direction;
a driven shaft that is driven according to rotation of the drive shaft;
a driven pulley that is attached to the driven shaft;
a belt that is wound between the drive pulley and the driven pulley; and
a drive-pulley thrust generating mechanism that moves the movable sheave relative to the drive shaft on the drive shaft, wherein the drive-pulley thrust generating mechanism includes a centrifugal weight that is rotatable relative to the movable sheave according to centrifugal force caused by the rotation of the drive shaft, a spider that includes an abutting portion on which the centrifugal weight abuts, is fixed to the drive shaft in the axial direction and the circumferential direction through screwing, and moves the movable sheave relative to the drive shaft in the axial direction according to rotation of the centrifugal weight, and a retaining member that is disposed adjacent to the spider in the axial direction at a position on a side on which the screwing of the spider is loosened, and is fixed to the drive shaft in the axial direction and the circumferential direction, and the retaining member is disposed at a position that is, in the axial direction of the drive shaft, closer to the centrifugal weight than a farthest part of the spider from the centrifugal weight.

* * * * *